United States Patent
Haas et al.

(10) Patent No.: US 7,655,296 B2
(45) Date of Patent: Feb. 2, 2010

(54) INK-RECEPTIVE FOAM ARTICLE

(75) Inventors: Christopher K. Haas, Cottage Grove, MN (US); Robert D. Taylor, Stacy, MN (US); William B. Black, Eagan, MN (US); James M. Jonza, Woodbury, MN (US); Terrence E. Cooprider, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 361 days.

(21) Appl. No.: 11/460,436

(22) Filed: Jul. 27, 2006

(65) Prior Publication Data

US 2006/0257594 A1    Nov. 16, 2006

Related U.S. Application Data

(63) Continuation-in-part of application No. 10/502,229, filed as application No. PCT/US03/11255 on Apr. 10, 2003, now abandoned.

(51) Int. Cl.
*B32B 27/00* (2006.01)

(52) U.S. Cl. .............. 428/319.3; 428/317.9; 428/319.7; 428/314.8; 428/316.6; 428/131; 428/195.1

(58) Field of Classification Search ............... 428/319.3, 428/317.9, 319.7, 314.8, 316.6, 131, 195.1
See application file for complete search history.

(56) References Cited

U.S. PATENT DOCUMENTS 3,782,870 A    1/1974    Schippers
3,855,376 A    12/1974   Ono et al.
3,884,606 A    5/1975    Schrenk
3,889,270 A    6/1975    Hoffmann et al.
4,038,350 A    7/1977    Jaques
4,107,247 A    8/1978    Dukess (Continued)

FOREIGN PATENT DOCUMENTS

AU    488652    4/1976

(Continued)

OTHER PUBLICATIONS

H. C. Lau et al., "Melt Strength of Polypropylene: Its Relevance to Thermoforming", Polymer Engineering and Science, (Nov. 1998), pp. 1915-1923, vol. 38, No. 11.

(Continued)

*Primary Examiner*—Betelhem Shewareged
(74) *Attorney, Agent, or Firm*—Kent S. Kokko

(57) ABSTRACT

The present invention is directed an oriented, foamed article having an ink-receptive surface, and a method of making the article. The invention provides a printable substrate comprising at least one high melt-strength, oriented polypropylene foam layer having an ink-receptive surface. The high melt-strength polypropylene having a melt strength of 25 to 60 cN at 190° C. The ink-receptive surface may comprise and oxidizing treatment, such as corona or flame-treatment of the foam surface, or may comprise an ink-receptive coating, such as a primer coating, on the foam surface.

The oriented foam article is particularly useful in the preparation of printed security documents such as currency, stock and bond certificates, birth and death certificates, land titles and abstracts and the like.

24 Claims, 2 Drawing Sheets

U.S. PATENT DOCUMENTS

| | | | |
|---|---|---|---|
| 4,162,343 A | 7/1979 | Wilcox et al. | |
| 4,206,165 A | 6/1980 | Dukess | |
| 4,221,624 A | 9/1980 | Eslinger et al. | |
| 4,310,591 A | 1/1982 | Lee et al. | |
| 4,379,804 A | 4/1983 | Eisele et al. | |
| 4,503,111 A | 3/1985 | Jaeger et al. | |
| 4,518,557 A | 5/1985 | Wecker | |
| 4,536,016 A | 8/1985 | Solomon et al. | |
| 4,555,437 A | 11/1985 | Tanck | |
| 4,564,560 A | 1/1986 | Tani et al. | |
| 4,613,525 A * | 9/1986 | Miyamoto et al. | 427/256 |
| 4,657,811 A | 4/1987 | Boyd et al. | |
| 4,714,716 A | 12/1987 | Park | |
| 4,747,983 A | 5/1988 | Colombo | |
| 4,761,256 A | 8/1988 | Hardenbrook et al. | |
| 4,775,594 A | 10/1988 | Desjarlais | |
| 4,844,979 A | 7/1989 | Strobel et al. | |
| 4,896,901 A | 1/1990 | Ekelund | |
| 4,916,198 A | 4/1990 | Scheve et al. | |
| 4,937,134 A | 6/1990 | Schrenk et al. | |
| 4,940,736 A | 7/1990 | Alteepping et al. | |
| 5,089,318 A | 2/1992 | Shetty et al. | |
| 5,126,195 A | 6/1992 | Light | |
| 5,134,198 A | 7/1992 | Stofko, Jr. et al. | |
| 5,198,306 A | 3/1993 | Kruse | |
| 5,215,691 A | 6/1993 | Bland et al. | |
| 5,234,729 A | 8/1993 | Wheatley et al. | |
| 5,240,767 A | 8/1993 | Umezu et al. | |
| 5,264,275 A | 11/1993 | Misuda et al. | |
| 5,342,688 A | 8/1994 | Kitchin et al. | |
| 5,393,099 A | 2/1995 | D'Amato | |
| 5,429,856 A | 7/1995 | Krueger et al. | |
| 5,449,200 A | 9/1995 | Andric et al. | |
| 5,489,471 A | 2/1996 | Inoue et al. | |
| 5,536,468 A | 7/1996 | Leese | |
| 5,605,936 A | 2/1997 | DeNicola, Jr. et al. | |
| 5,618,630 A | 4/1997 | Benoit et al. | |
| 5,660,919 A | 8/1997 | Vallee et al. | |
| 5,678,863 A | 10/1997 | Knight et al. | |
| 5,698,333 A | 12/1997 | Benoit et al. | |
| 5,716,695 A | 2/1998 | Benoit et al. | |
| 5,721,806 A | 2/1998 | Lee | |
| 5,766,398 A | 6/1998 | Cahill et al. | |
| 5,824,400 A | 10/1998 | Petrakis et al. | |
| 5,834,098 A | 11/1998 | Kitamura et al. | |
| 5,871,833 A | 2/1999 | Henbo et al. | |
| 5,879,028 A | 3/1999 | Benoit | |
| 5,882,774 A | 3/1999 | Jonza et al. | |
| 5,935,696 A | 8/1999 | Benoit et al. | |
| 6,001,469 A | 12/1999 | Verardi et al. | |
| 6,008,286 A | 12/1999 | Groves | |
| 6,045,894 A | 4/2000 | Jonza et al. | |
| 6,062,604 A | 5/2000 | Taylor et al. | |
| 6,074,747 A | 6/2000 | Scholz et al. | |
| 6,096,247 A | 8/2000 | Ulsh et al. | |
| 6,096,469 A * | 8/2000 | Anderson et al. | 427/256 |
| 6,114,022 A | 9/2000 | Warner et al. | |
| 6,164,739 A * | 12/2000 | Schulz et al. | 312/406 |
| 6,288,842 B1 | 9/2001 | Florczak et al. | |
| 6,316,120 B1 | 11/2001 | Emslander | |
| 6,447,875 B1 | 9/2002 | Norquist et al. | |
| 6,468,451 B1 * | 10/2002 | Perez et al. | 264/48 |
| 6,495,231 B2 | 12/2002 | Benoit et al. | |
| 6,589,636 B2 | 7/2003 | Emslander et al. | |
| 6,641,910 B1 | 11/2003 | Bries et al. | |
| 6,808,657 B2 | 10/2004 | Fansler et al. | |
| 2001/0000147 A1 | 4/2001 | Benoit et al. | |
| 2001/0000236 A1 | 4/2001 | Benoit et al. | |
| 2001/0021450 A1 | 9/2001 | Ramesh | |
| 2002/0013399 A1 | 1/2002 | Groves | |
| 2002/0051867 A1 | 5/2002 | Hiraki et al. | |
| 2002/0054434 A1 | 5/2002 | Florczak et al. | |
| 2003/0072931 A1 | 4/2003 | Hebrink et al. | |
| 2004/0053044 A1 | 3/2004 | Moreno et al. | |

FOREIGN PATENT DOCUMENTS

| | | |
|---|---|---|
| CA | 948820 | 6/1974 |
| EP | 1 209 518 A2 | 5/2002 |
| EP | 1 209 519 A2 | 5/2002 |
| GB | 1 439 438 | 6/1976 |
| WO | 94/28077 A1 | 12/1994 |
| WO | 94/29119 A1 | 12/1994 |
| WO | 96/00146 A1 | 1/1996 |
| WO | 97/01438 A1 | 1/1997 |
| WO | 97/17493 A1 | 5/1997 |
| WO | 98/13211 A1 | 4/1998 |
| WO | 99/03929 A1 | 1/1999 |
| WO | 99/36466 A1 | 7/1999 |
| WO | 99/54148 A1 | 10/1999 |
| WO | 99/61520 A1 | 12/1999 |
| WO | 99/67092 A1 | 12/1999 |
| WO | 99/67093 A1 | 12/1999 |
| WO | 00/00520 A1 | 1/2000 |
| WO | 00/18575 A1 | 4/2000 |
| WO | 00/74936 A1 | 12/2000 |
| WO | 00/74948 A1 | 12/2000 |
| WO | 01/02192 A1 | 1/2001 |
| WO | 01/30570 A1 | 5/2001 |
| WO | 01/94124 A2 | 12/2001 |
| WO | 01/96125 A1 | 12/2001 |
| WO | 02/00412 A2 | 1/2002 |
| WO | 02/00412 A3 | 1/2002 |
| WO | 02/00982 A1 | 1/2002 |
| WO | 02/051867 A1 | 7/2002 |

OTHER PUBLICATIONS

J. I. Raukola, "A New Technology to Manufacture Polypropylene Foam Sheet and Bioaxially Oriented Foam Film", VTT Publications 361, Technical Research Center of Finland, (1998).

J. H. Schut, "Foamed Films Find New Niches", Plastics Technology, (Feb. 2002).

R. A. Ryntz, "The Effects of Solvent and Thermal History on the Adhesion of Coatings to Thermoplastic Olefins (TPOs)", Waterborne, High-Solids, and Powder Coatings Symposium, (Feb. 22-24, 1995), pp. 514-534, Symposium Sponsored by The University of Southern Mississippi, Department of Polymer Science, and Southern Society for Coatings Technology.

* cited by examiner

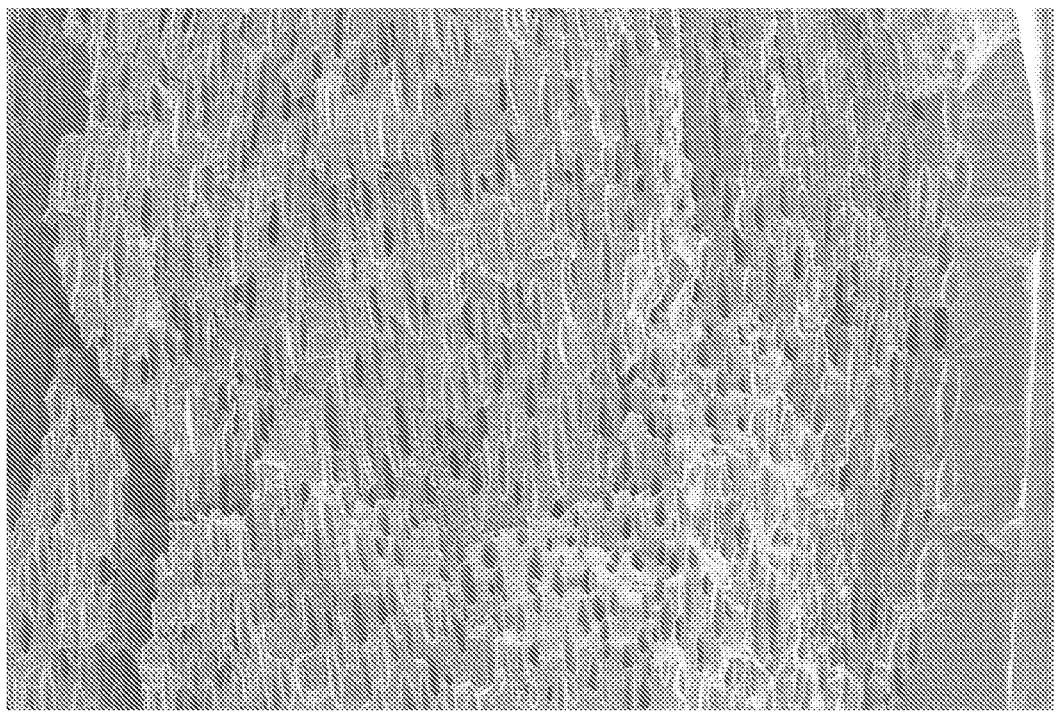
FIG. 3   100 μm
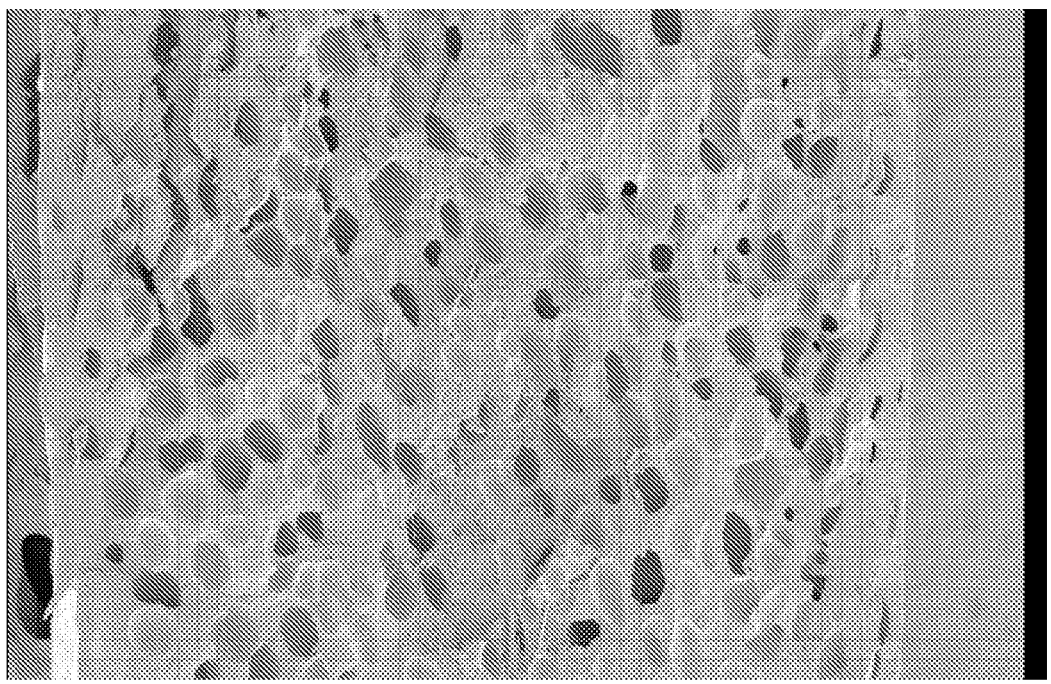
FIG. 4   429 μm

INK-RECEPTIVE FOAM ARTICLE

CROSS REFERENCE TO RELATED APPLICATIONS

This application is a continuation-in-part of U.S. application Ser. No. 10/502,229, filed Jul. 21, 2004 now abandoned, which is a national stage filing under 35 U.S.C. 371 of International Application No. PCT/US03/11255, filed Apr. 10, 2003, which International Application was published the International Bureau in English on Dec. 24, 2003 as WO 03/106183, which in turn claims priority to U.S. application Ser. No. 10/175,020, filed Jun. 18, 2002, the disclosure of which is herein incorporated by reference.

FIELD OF THE INVENTION

The present invention is directed to an oriented, foamed article having an ink-receptive surface, and a method of making the article.

BACKGROUND

Many film materials, unlike paper, have no inherent capacity to absorb inks that are commonly used in printing processes. Paper however, is not a particularly durable substrate and may be damaged by handling, environmental exposure and water.

The capture of the image-forming ink on polymeric substrates presents a technical challenge because plastic film is substantially impervious to liquids. Hydrophilic coatings, applied to film materials, are known to provide receptor layers for inkjet images. Receptor layers of this type may be porous for absorbing ink droplets via capillary action. Such coatings are described, for example, in U.S. Pat. No. 5,264,275. An alternative type of absorbent inkjet receptive coating comprises polymers that swell while absorbing image forming ink droplets. Such coatings include those described in U.S. Pat. Nos. 3,889,270, 4,503,111, 4,564,560, 4,555,437, 4,379,804, 5,134,198 and 5,342,688. Hydrophilic inkjet-receptive coatings may also include multilayer coatings as described in U.S. Pat. No. 4,379,804.

For many applications however, polymeric films do not provide the same texture and handling characteristics of paper substrates. Polymeric security documents offer several benefits over their paper counterparts. In particular, polymeric banknotes can offer greatly increased durability and resistance to counterfeiting through the incorporation of security features. A requirement for polymeric banknotes is that certain physical properties are similar to the more commonly used paper banknotes. Those properties relate to tactile feel, strength, tear resistance, handling, folding, and crumple resistance.

U.S. Pat. No. 4,536,016 teaches the use of a laminate for banknotes having biaxially oriented polymeric film and a non-printed window for the incorporation of a security feature. However, U.S. Pat. Nos. 5,698,333 and 5,935,696 discuss the shortcomings of banknotes based on the '016 teachings and offers a substrate construction primarily based on a polyolefin laminate which offers improved physical properties. U.S. Pat. Nos. 5,393,099 and 5,449,200 offer yet another alternative to '016, in which a banknote is described that includes outer layers of paper laminated to a polymeric core as a way to include paper-like properties.

Polymeric banknotes offer unique opportunities to incorporate security features that are designed to discourage counterfeiting. Many patents relating to banknotes, including those cited above, mention the possibility of a transparent window somewhere on the banknote, which offers a quick visual check for authenticity and is difficult to reproduce with copying techniques. In most cases, the security feature must be added as a separate component with an additional process step.

U.S. Pat. No. 5,234,729 teaches polymeric laminates having a large number of layers and exhibiting optically unique properties. The '729 patent even suggests that the subject of that patent could be formed into plastic currency but fails to address the physical properties required for that application. See additional references U.S. Pat. Nos. 4,162,343, 4,937, 134, and 5,089,318. U.S. Pat. No. 6,045,894 teaches multilayered optical films with unique optical properties that can be used as security features on certain documents of value but also fails to teach the necessary embodiments for such a film to be useful as a banknote, particularly having those physical properties required of a banknote.

SUMMARY OF THE INVENTION

The invention provides a printable substrate comprising at least one oriented, high melt-strength polypropylene foam layer having an ink-receptive surface. The ink-receptive surface may comprise an oxidizing treatment, such as corona or flame-treatment of the foam surface, or may comprise an ink-receptive coating, such as a primer coating, on the foam surface, or may comprise a laminated or coextruded polymer film that is ink-receptive.

The invention further provides a multilayer article comprising at least one oriented, high melt strength foam layer and at least one non-foam layer. Preferably the non-foam layer is a thermoplastic film layer. In such multilayer article constructions comprising foam and thermoplastic film layer(s), either the foam layer or the film layer may have an ink-receptive surface thereon. Preferably, the multilayer construction comprises two oriented, high melt strength polypropylene foam layers and a thermoplastic film layer disposed between the foam layers. More preferably, the thermoplastic film layer comprises a thermoplastic polymer that imparts stiffness to the multilayer article.

The invention further provides a method of making the printable substrate by the steps of providing an oriented, high melt-strength polypropylene foam, and providing an ink-receptive surface on at least one major surface of the foam The present invention also provides a method of preparing an ink-receptive, multilayer article comprising at least one high-melt strength polypropylene foam layer and at least one thermoplastic film layer. Either the foam layer or the film layer may have an ink-receptive surface thereon. The multilayer article may be prepared by separately preparing the foam and film layers, and laminating, bonding or otherwise affixing them together, or the separate layers may be coextruded into a multilayer article. If the film layer(s) constitute an outermost layer, as in a film/foam/film construction, the film layer(s) may be treated to render them ink-receptive such as by corona or an ink-receptive coating, or the thermoplastic film layer may be inherently ink-receptive.

The oriented foam article is particularly useful in the preparation of printed security documents such as currency, stock and bond certificates, birth and death certificates, checks, titles and abstracts and the like.

Polymeric documents offer several benefits over their paper counterparts. In particular, polymeric security documents can offer greatly increased durability and resistance to counterfeiting through the incorporation of security features. A requirement for some polymeric security documents is that certain physical properties are similar to the more commonly used paper banknotes. Those properties relate to tactile feel, strength, tear resistance, handling, folding, and crumple resistance.

These foamed articles exhibit improved crumple and crease recovery compared to previously known multilayer optical films, synthetic papers, or currency papers. The proper modulus and tear strength, superior folding endurance, and crumple and crease recovery properties fits the market need for increased durability. Advantageously, the articles of the present invention may provide security characteristics, such as color shifting inks or films, embossments, translucent or transparent regions, holographic indicia and the like. These articles, when used in security documents, meet or exceed one or more of the requirements of the U.S. Bureau of Engraving and Printing including the crumple test, the chemical resistance test and the laundering test. Reference may be made to Bureau of Engraving standard test methods 300.002, 300.004, and 300,005.

As used in this invention:

"High melt strength polypropylene" refers to homo- and copolymers containing 50 weight percent or more propylene monomer units, and having a melt strength in the range of 25 to 60 cN at 190° C.

"Ink receptive" means a coating, treatment or layer which that is wetted by the ink and the ink adheres thereto.

Alpha-transition temperature, Tαc, means to the temperature at which crystallite subunits of a polymer are capable of being moved within the larger lamellar crystal unit. Above this temperature lamellar slip can occur, and extended chain crystals form, with the effect that the degree of crystallinity is increased as amorphous regions of the polymer are drawn into the lamellar crystal structure.

"Security document" means a document that might be prone to counterfeiting, and may be taken from, but not limited to the following example: currency, stock and bond certificates, birth and death certificates, automobile titles, land titles and abstracts and the like.

"Small-cell foam" means a foam having average cell dimensions of less than 100 micrometers (μm), preferably 5 to 50 μm (prior to orientation);

"closed-cell" means a foam that contains substantially no connected cell pathways that extend from one outer surface through the material to another outer surface;

"operating temperature" means the temperature that must be achieved in the extrusion process to melt all of the polymeric materials in the melt mix;

"exit temperature" and "exit pressure" mean the temperature and pressure of the extrudate in the final zone or zones of the extruder;

"melt solution" or "melt mixture" or "melt mix" means a melt-blended mixture of polymeric material(s), any desired additives, and blowing agent(s) wherein the mixture is sufficiently fluid to be processed through an extruder;

"neat polymer" means a polymer that contains small amounts of typical heat-stabilizing additives, but contains no fillers, pigments or other colorants, blowing agents, slip agents, anti-blocking agents, lubricants, plasticizers, processing aids, antistatic agents, ultraviolet-light stabilizing agents, or other property modifiers;

"foam density" means the weight of a given volume of foam;

"density reduction" refers to a way of measuring the void volume of a foam based on the following formula:

$$\rho_R = \left[1 - \frac{\rho_f}{\rho_o}\right] \times 100\%$$

where $\rho_R$ is the density reduction, $\rho_f$ is the foam density, and $\rho_o$ is the density of the original material;

"polydispersity" means the weight average cell diameter divided by the number average cell diameter for a particular foam sample; it is a means of measuring the uniformity of cell sizes in the sample; and is defined by the equation:

$$\text{Polydispersity} = \frac{\sum n_i \phi_i^2 / \sum n_i \phi_i}{\sum n_i \phi_i / \sum n_i}$$

"uniform" means that the cell size distribution has a polydispersity of 1.0 to 2.0;

"spherical" means generally rounded; it may include spherical, oval, or circular structure;

"polymer matrix" means the polymeric, or "non-cell," areas of a foam;

"α-olefin" means an olefin having three or more carbon atoms and having a —CH=CH$_2$ group.

"total draw ratio" means the product of the draw ratios in the machine and transverse directions, i.e=MD×CD.

BRIEF DESCRIPTION OF THE FIGURES

FIG. 3 is a digital image of a scanning electron micrograph (SEM) of a cross-section (MD) of the ink receptive article of Example 3.

FIG. 4 is a digital image of a scanning electron micrograph (SEM) of a cross-section (CD) of the ink receptive article of Example 4.

DETAILED DESCRIPTION

Figure 1:
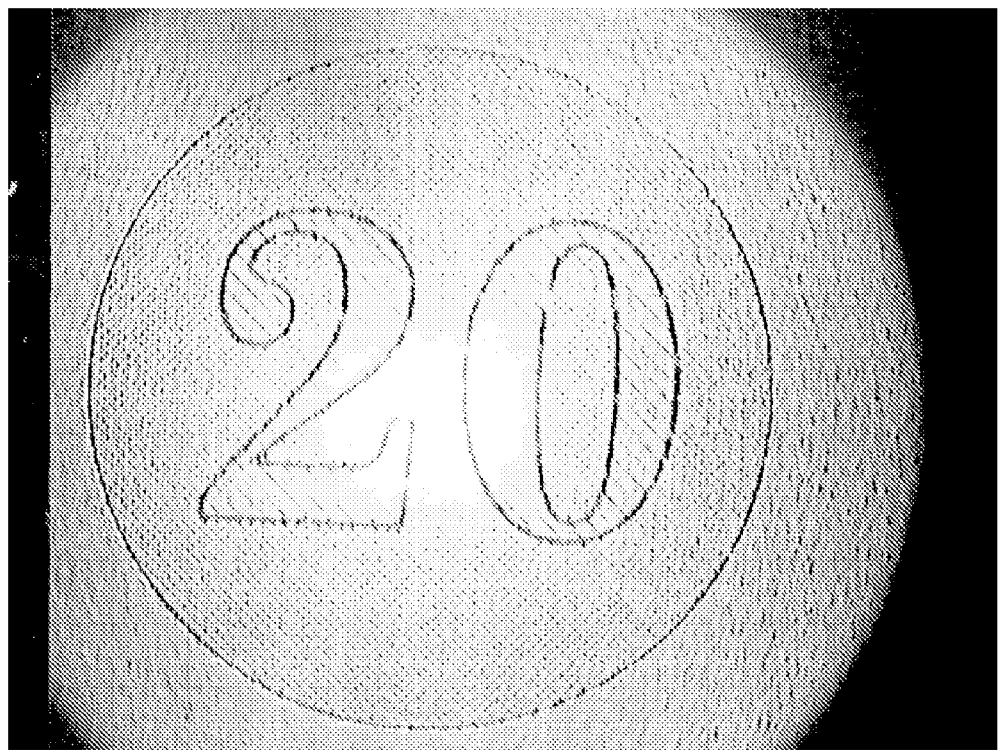
FIGS. 1 and 2 are digital images of a scanning electron micrograph (SEM) of the ink receptive article of Example 1.
Figure 2:
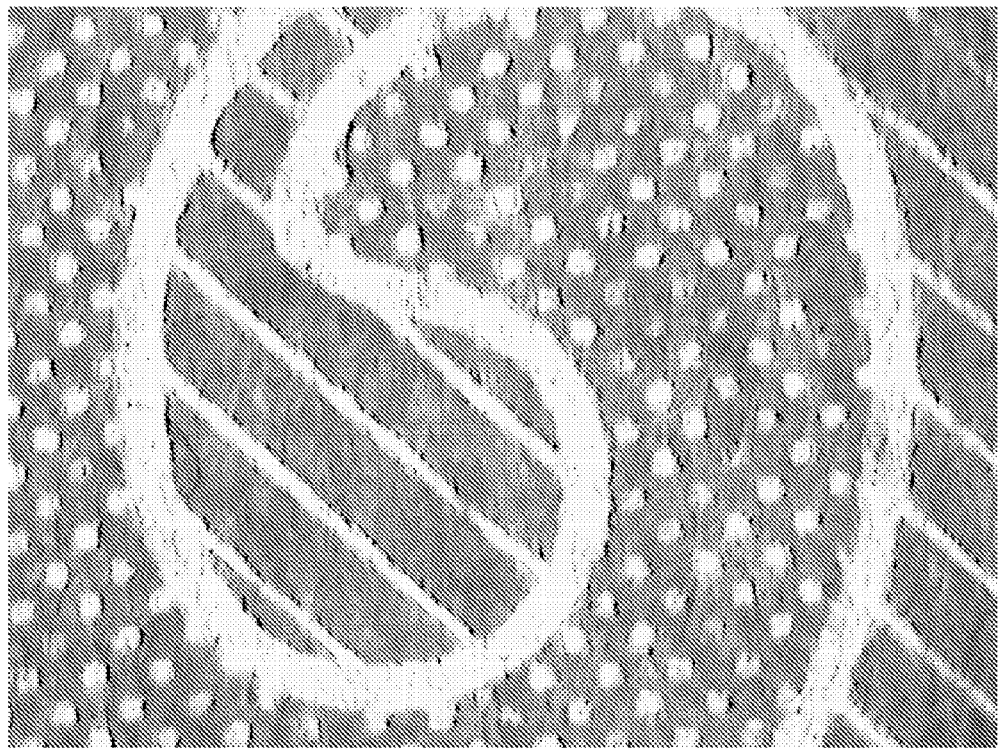

The ink-receptive substrate may be prepared by the steps of:

(1) providing an oriented, high melt-strength polypropylene foam, and (2) providing an ink-receptive surface on at least one major surface of the foam, wherein the ink-receptive surface may comprise a surface treatment, such as corona or flame treatment, an ink-receptive coating, or a film layer that is inherently ink-receptive.

The oriented, high melt-strength polypropylene foam may be prepared by the steps of:

(1) mixing at least one high melt strength polypropylene and at least one blowing agent in an apparatus having an exit shaping orifice at a temperature and pressure sufficient to form a melt mixture wherein the blowing agent is uniformly distributed throughout the polypropylene;

(2) reducing the temperature of the melt mixture at the exit of the apparatus to an exit temperature that is no more than 30° C. above the melt temperature of the neat polypropylene while maintaining the melt mixture at a pressure sufficient to prevent foaming;

(3) passing the mixture through said exit shaping orifice and exposing the mixture to atmospheric pressure, whereby the blowing agent expands causing cell formation resulting in foam formation, and (4) orienting said foam.

The oriented, high melt-strength polypropylene foam may be prepared by using a foamable mixture comprising a major amount of a high melt-strength polypropylene and a minor amount of second polymer component comprising a semicrystalline or amorphous thermoplastic polymer. Polymer mixtures comprising a high melt-strength polypropylene and two or more added polymers are also within the scope of the invention.

The high melt strength polypropylene useful in the present invention includes homo- and copolymers containing 50 weight percent or more propylene monomer units, preferably at least 70 weight percent, and has a melt strength in the range of 25 to 60 cN at 190° C. Melt strength may be conveniently measured using an extensional rheometer by extruding the polymer through a 2.1 mm diameter capillary having a length of 41.9 mm at 190° C. and at a rate of 0.030 cc/sec; the strand is then stretched at a constant rate while measuring the force to stretch at a particular elongation. Preferably the melt strength of the polypropylene is in the range of 30 to 55 cN, as described in WO 99/61520.

The melt strength of linear or straight chain polymers, such as conventional isotactic polypropylene, decreases rapidly with temperature. In contrast, the melt strength of highly branched polypropylenes does not decrease rapidly with temperature. It is generally believed that the differences in melt strengths and extensional viscosity is attributable to the presence of long chain branching. Useful polypropylene resins are those that are branched or crosslinked. Such high melt strength polypropylenes may be prepared by methods generally known in the art. Reference may be made to U.S. Pat. No. 4,916,198 (Scheve et al) which describes a high melt strength polypropylene having a strain-hardening elongational viscosity prepared by irradiation of linear propylene in a controlled oxygen environment. Other useful methods include those in which compounds are added to the molten polypropylene to introduce branching and/or crosslinking such as those methods described in U.S. Pat. No. 4,714,716 (Park), WO 99/36466 (Moad, et al.) and WO 00/00520 (Borve et al.). High melt strength polypropylene may also be prepared by irradiation of the resin as described in U.S. Pat. No. 5,605,936 (Denicola et al.). Still other useful methods include forming a bimodal molecular weight distribution as described in J. I. Raukola, *A New Technology To Manufacture Polypropylene Foam Sheet And Biaxially Oriented Foam Film*, VTT Publications 361, Technical Research Center of Finland, 1998 and in U.S. Pat. No. 4,940,736 (Alteepping and Nebe).

The foamable polypropylene may be comprised solely of propylene homopolymer or may comprise a copolymer having 50 wt % or more propylene monomer content. Further, the foamable propylene may comprise a mixture or blend of propylene homopolymers or copolymers with a homo- or copolymer other than propylene homo- or copolymers.

Particularly useful propylene copolymers are those of propylene and one or more non-propylenic monomers. Propylene copolymers include random, block, and grafted copolymers of propylene and olefin monomers selected from the group consisting of ethylene, C3-C8 α-olefins and C4-C10 dienes. Propylene copolymers may also include terpolymers of propylene and α-olefins selected from the group consisting of C3-C8 α-olefins, wherein the α-olefin content of such terpolymers is preferably less than 45 wt %. The C3-C8 α-olefins include 1-butene, isobutylene, 1-pentene, 3-methyl-1-butene, 1-hexene, 3,4-dimethyl-1-butene, 1-heptene, 3-methyl-1-hexene, and the like. Examples of C4-C10 dienes include 1,3-butadiene, 1,4-pentadiene, isoprene, 1,5-hexadiene, 2,3-dimethyl hexadiene and the like.

Minor amounts (less than 50 percent by weight) of other semicrystalline polymers that may be added to the high melt strength polypropylene in the foamable composition include high, medium, low and linear low density polyethylene, fluoropolymers, poly(1-butene), ethylene/acrylic acid copolymer, ethylene/vinyl acetate copolymer, ethylene/propylene copolymer, styrene/butadiene copolymer, ethylene/styrene copolymer, ethylene/ethyl acrylate copolymer, ionomers and thermoplastic elastomers such as styrene/ethylene/butylene/styrene (SEBS), and ethylene/propylene/diene copolymer (EPDM).

Minor amounts (less than 50 percent by weight) of amorphous polymers may be added to the high melt strength polypropylene. Suitable amorphous polymers include, e.g., polystyrenes, polycarbonates, polyacrylics, polymethacrylics, elastomers, such as styrenic block copolymers, e.g., styrene-isoprene-styrene (SIS), styrene-ethylene/butylene-styrene block copolymers (SEBS), polybutadiene, polyisoprene, polychloroprene, random and block copolymers of styrene and dienes (e.g., styrene-butadiene rubber (SBR)), ethylene-propylene-diene monomer rubber, natural rubber, ethylene propylene rubber, polyethylene-terephthalate (PETG). Other examples of amorphous polymers include, e.g., polystyrene-polyethylene copolymers, polyvinylcyclohexane, polyacrylonitrile, polyvinyl chloride, thermoplastic polyurethanes, aromatic epoxies, amorphous polyesters, amorphous polyamides, acrylonitrile-butadiene-styrene (ABS) copolymers, polyphenylene oxide alloys, high impact polystyrene, polystyrene copolymers, polymethylmethacrylate (PMMA), fluorinated elastomers, polydimethyl siloxane, polyetherimides, amorphous fluoropolymers, amorphous polyolefins, polyphenylene oxide, polyphenylene oxide—polystyrene alloys, copolymers containing at least one amorphous component, and mixtures thereof.

In addition to the high melt strength polypropylene, the foam layer may contain other added components such as dyes, particulate materials, a colorant, an ultraviolet absorbing material, inorganic additives, and the like. Useful inorganic additives include $TiO_2$, $CaCO_3$, or high aspect ratio fillers such as wollastonite glass fibers and mica.

One useful means to provide an ink receptive surface is in the use of special treatments to change the condition of a surface by increasing its surface energy. Surface treatments for increased surface energy include oxidizing pretreatments or the use of ink-receptive coatings. Oxidizing pre-treatments include the use of flame, ultraviolet radiation, corona discharge, plasma, chemical oxidizing agents and the like.

An ink receptive surface may be provided by first treating the foam (or film if multilayer) substrate by flame treatment, or corona treatment. These surface treatments are believed to provide three characteristics to the foam surface. The three unifying characteristics are an increase in the oxygen or amino content of the treated surface as compared to the bulk material, an increase in the hydrophilicity of the surface, and an increase in the acidity of the surface. These treatments to the surface of the substrate improve the wetting and the adhesion of the applied ink.

Another ink-receptive layer may be derived from polymeric coatings. Useful ink-receptive coating can be any polymer from water-based or organic solvent-based systems that can be coated on and adhere to the foam layer. Preferably, the ink-receptive coating is water-resistant, yet can be coated from a water-based dispersion. Nonlimiting examples of such ink receptive coatings include ethylene-acrylic acid copolymers and their salts, styrene-acrylic acid copolymers and their salts, and other (meth)acrylic moiety containing polymers, vinylpyrrolidone homopolymers and copolymers and substituted derivatives thereof, vinyl acetate copolymers (e.g., copolymers of vinylpyrrolidone and vinyl acetate; copolymers of vinyl acetate and acrylic acid, etc.) and hydrolyzed derivatives thereof, polyvinyl alcohol; halogen-substituted hydrocarbon polymers, acrylic acid homopolymers and copolymers; acrylamide homopolymers and copolymers;

cellulosic polymers; styrene copolymers with allyl alcohol, acrylic acid and/or maleic acid or esters thereof, alkylene oxide polymers and copolymers; gelatins and modified gelatins; polysaccharides; and the like as disclosed in U.S. Pat. Nos. 5,766,398; 4,775,594; 5,126,195; 5,198,306.

Preferably the ink receptive layer is permanently adhered to the foam layer and may be hydrophilic, ink sorptive, coating material. The ink receptive layer may be visually transparent, translucent or opaque. The image-transparent, ink receptive layer may be prepared from a wide variety of hydrophilic, ink sorptive, coating materials. In current industry practice, the ink receptive layer typically is formulated to provide suitable ink receptivity tuned for a particular printing technique and related ink used therein. In general, suitable formulations for the ink receptive layer are disclosed in Desjarlais, U.S. Pat. No. 4,775,594; Light, U.S. Pat. No. 5,126,195; and Kruse, U.S. Pat. No. 5,198,306.

The ink receptive layer may comprise at least one hydrophilic polymer or resin that also may be water-soluble. Suitable hydrophilic polymers or resins include polyvinyl alcohols, including substituted polyvinyl alcohols; polyvinyl pyrrolidones, including substituted polyvinyl pyrrolidones; vinyl pyrrolidone/vinyl acetate copolymer; vinyl acetate/acrylic acid copolymers; acrylic acid polymers and copolymers; acrylamide polymers and copolymers; cellulosic polymers and copolymers; styrene copolymers of allyl alcohol, acrylic acid, maleic acid, esters or anhydride, and the like; alkylene oxide polymers and copolymers; gelatins and modified gelatins; polysaccharides; and the like. Preferred hydrophilic polymers include poly(vinyl pyrrolidone); substituted poly(vinyl pyrrolidone); poly(vinyl alcohol); substituted poly(vinyl alcohol); vinyl pyrrolidone/vinyl acetate copolymer; vinyl acetate/acrylic copolymer; polyacrylic acid; polyacrylamides; hydroxyethylcellulose; carboxyethylcellulose; gelatin; and polysaccharides.

A particularly useful ink-receptive coating includes copolymers of ethylene vinyl acetate, carbon monoxide and methyl acrylate; copolymers of acid and/or acrylate modified ethylene and vinyl acetate; and terpolymers of ethylene and any two polar monomers, for example vinyl acetate and carbon monoxide. Commercially available modified olefin resins that are useful as ink-receptive coating sinclude: BYNEL 3101, an acid-acrylate modified ethylene vinyl acetate copolymer; ELVALOY 741, a terpolymer of ethylene/vinyl acetate/carbon monoxide; ELVALOY 4924, a terpolymer of ethylene/vinyl acetate/carbon monoxide; ELVALOY 1218AC, a copolymer of ethylene and methyl acrylate; and FUSABOND MG-423D, a modified ethylene/acrylate/carbon monoxide terpolymer. All are available from E.I. duPont De Nemours, Wilmington Del.

The ink receptive layer may also contain other water insoluble or hydrophobic polymers or resins to impart a suitable degree of hydrophilicity and/or other desirable physical and chemical characteristics. Suitable polymers or resins of this class include polymers and copolymers of styrene, acrylics, urethanes, and the like. Preferred polymers and resins of this type include a styrenated acrylic copolymer; styrene/allyl alcohol copolymer; nitrocellulose; carboxylated resin; polyester resin; polyurethane resin; polyketone resin; polyvinyl butyral resin; or mixtures thereof.

Other useful ink-receptive coatings include those described in U.S. Pat. Nos. 5,721,806, 6,316,120, 5,240,767, 5,834,098, 6,495,231, 6,800,341, 6,793,859 and 6,589,636.

In addition to the polymeric or resin components, the ink receptive layer may contain other added components such as a dye mordant, a surfactant, particulate materials, a colorant, an ultraviolet absorbing material, an organic acid, an optical brightener, antistatic agents, antiblocking agents and the like. Dye mordants that may be used to fix the printed ink to the ink receptive layer may be any conventional dye mordant. e.g. such as polymeric quaternary ammonium salts, poly(vinyl pyrrolidone), and the like. Surfactants that are used as coating aids for the ink receptive layer may be any nonionic, anionic, or cationic surfactant. Particularly useful, are fluorosurfactants, alkylphenoxypolyglycidols, and the like.

The ink receptive layer may also contain a particulate additive. Such additives may enhance the roughness characteristics of the ink receptive surface, particularly after it has been printed. Suitable particulate additives includes inorganic particles such as silicas, chalk, calcium carbonate, magnesium carbonate, kaolin, calcined clay, pyrophylite, bentonite, zeolite, talc, synthetic aluminum and calcium silicates, diatomaceous earth, anhydrous silicic acid powder, aluminum hydroxide, barite, barium sulfate, gypsum, calcium sulfate, and the like; and organic particles such as polymeric beads including beads of polymethylmethacrylate, copoly(methylmethacrylate/divinylbenzene), polystyrene, copoly(vinyltoluene/t-butylstyrene/methacrylic acid), polyethylene, and the like. Such polymeric beads may include minor amounts of divinylbenzene to crosslink the polymers.

The ink receptive layer may also contain a colorant, e.g., a dye or pigment. This layer may contain components which strongly absorb ultraviolet radiation thereby reducing damage to underlying images by ambient ultraviolet light, e.g., such as 2-hydroxybenzophenones; oxalanilides; aryl esters and the like; hindered amine light stabilizers, such as bis(2,2,6,6-tetramethyl-4-piperidinyl) sebacate and the like; and combinations thereof.

Organic acids which may be used to adjust the pH and hydrophilicity in the ink receptive layer typically are non-volatile organic acids such as alkoxyacetic acids, glycolic acid, dibasic carboxylic acids and half esters thereof, tribasic carboxylic acids and partial esters thereof, aromatic sulfonic acids, and mixtures thereof. Preferred organic acids include glycolic acid, methoxy acetic acid, citric acid, malonic acid, tartaric acid, malic acid, maleic acid, fumaric acid, itaconic acid, succinic acid, oxalic acid, 5-sulfo-salicycilic acid, p-toluenesulphonic acid, and mixtures thereof. Optical brighteners that may be used to enhance the visual appearance of the imaged layer may be any conventional, compatible optical brightener, e.g., such as optical brighteners marketed by Ciba-Geigy under the trademark of Tinopal™.

Another useful ink-receptive coating is described in U.S. Pat. No. 6,008,286, which provides compositions comprising mixtures of hydrocarbon polymers, halogen-substituted hydrocarbon polymers and substituted aliphatic isocyanates which, coated from solvent, improve the bond between low energy substrates and adhesives, coatings, printing inks and the like.

Solvent based or aqueous based thermosettable primers may be used, for ink-receptive coatings, without a flame or corona preliminary treatment. U.S. Pat. No. 6,001,469 describes primers and topcoats of this type used with e.g. thermoplastic polyolefins. These materials may be suitably cured on the substrate at temperatures in the region of 130° C. for 30 minutes. Similarly WIPO publication WO 94/28077 describes aqueous-based compositions requiring heat treatment at 130° C. for 40 minutes. It is known (see e.g. R. Ryntz in "Waterborne, High Solids Powder Coatings Symposium," Univ. of Southern Mississippi 1995), that high temperature treatment may also affect the surface morphology of thermoplastic polyolefin polymers. Such changes may be beneficial in some cases, but in others the relatively high temperature for curing may be sufficiently close to the material melting point to produce substrate dimensional changes and associated problems.

Another useful ink-receptive coating composition is described in U.S. Pat. No. 6,410,636 (Groves). The reference describes a water dispersed primer composition comprising a solution of a halogenated hydrocarbon polymer in organic solvent and a dispersing agent added to the solution to form a fluid primer to be dispersed in water to provide the water dispersed primer composition. Organic solvents may be selected from cyclohexane, heptane, hexane, xylene, toluene, chlorotoluene, mixed hydrocarbon solvents and mixtures thereof.

The ink receptive coating layer may also contain inorganic particles, which have the capacity to absorb ink. In a preferred embodiment, the inorganic particles have the capacity to bind ink colorants. Because ink absorbing capacity may vary with the composition of the ink being absorbed, preferred absorbing capacities will be described in terms of water absorbing capacity. In a preferred embodiment, the organic particles have a water absorbing capacity of between 20 µl/g and 0.2 ml/g.

Suitable inorganic particles may comprise metal oxides. Preferred metal oxides include titanium oxides such as rutile, titanium monoxide, titanium sesquioxide; silicon oxides, such as silica, surfactant coated silica particles, zeolites, and surface treated derivatives thereof such as for example fluorinated silicas as described in U.S. Pat. No. 6,071,614; aluminum oxides such as aluminas, for example boehmite, pseudoboehmite, bayerite, mixed oxides such as aluminum oxyhydroxide, alumina particles having a silica core; zirconium oxides such as zirconia and zirconium hydroxide; and mixtures thereof silicon oxides and aluminum oxides are especially preferred.

Silicas have been found to interact with pigment particles in inks and any dispersants associated with the pigment particles (in pigmented inks). Silicas useful in the invention include amorphous precipitated silicas alone or in mixture with fumed silicas. Such silicas have typical primary particle sizes ranging from about 15 nm to about 6 µm. These particle sizes have great range, because two different types of silicas are useful in the present invention. The optional fumed silicas have a much smaller particle size than the amorphous precipitated silicas and typically constitute the lesser proportion of the mixture of silicas when both are present. Generally when both are present in the mixture, the weight ratio of silicas (amorphous:fumed) ranges greater than about 1:1 and preferably greater than about 3:1.

The invention also provides multilayer ink-receptive articles comprising at least one oriented, high melt strength polypropylene foam layer and at least one non-foam layer. Preferably the non-foam layer is a thermoplastic film layer. In such multilayer constructions, at least one of the foam layers or thermoplastic films layers will be ink-receptive due to surface treatment such as corona treatment, an ink-receptive coating, or the thermoplastic film layer is inherently ink-receptive. For example, if the multilayer article has a non-foam thermoplastic film layer as one or both of the outermost layers, the film layer may be treated to render it ink-receptive, it may be coated with an ink-receptive coating, or may be selected as inherently ink-receptive to produce an article of the construction ink receptive layer/foam/film/foam/ink receptive layer. If desired, the foam and non-foam layer(s) may also contain a colorant, e.g., a dye or pigment.

The thermoplastic film layer may be used in a multilayer construction for other purposes than providing an ink-receptive layer. Such layers may be added to improve the physical properties of the article, including handling characteristics such as bending stiffness. As such, a multilayer article may have the construction foam/film/foam, where one or both of the outermost foam layers are ink-receptive and the inner film layer is used to improve the handling properties such as the bending stiffness. Advantageously, the foam/film/foam constructions, with the softer foam layers on the outside, feel more like paper.

Polymeric materials used in the non-foam layer of multilayer films of the present invention include one or more melt-processible organic polymers, which may include thermoplastic, or thermoplastic elastomeric materials. Thermoplastic materials are generally materials that flow when heated sufficiently above their glass transition temperature, or if semicrystalline, above their melt temperatures, and become solid when cooled.

Thermoplastic materials useful in the present invention that are generally considered nonelastomeric include, for example, polyolefins such as isotactic polypropylene, low density polyethylene, linear low density polyethylene, very low density polyethylene, medium density polyethylene, high density polyethylene, polybutylene, nonelastomeric polyolefin copolymers or terpolymers such as ethylene/propylene copolymer and blends thereof, ethylene-vinyl acetate copolymers such as those available under the trade designation ELVAX from E.I. DuPont de Nemours, Inc., Wilmington, Del.; ethylene acrylic acid copolymers such as PRIMACOR from E.I. DuPont de Nemours; ethylene methacrylic acid copolymers such as those available under the trade designation SURLYN from E.I. DuPont de Nemours, Inc.; ethylene vinyl acetate acrylate copolymers such as those available under the trade designation BYNEL from E.I. DuPont de Nemours, Inc.; polymethylmethacrylate; polystyrene; ethylene vinyl alcohol; polyesters including amorphous polyester; cycloaliphatic amorphous polyolefins such as ZEONEX available from Zeon Chemical, and polyamides. Fillers, such as clays and talcs, may be added to improve the bending stiffness of the thermoplastic materials.

In the present invention, preferred organic polymers and homo- and copolymers of polyolefins including polyethylene, polypropylene and polybutylene homo- and copolymers.

Thermoplastic materials that have elastomeric properties are typically called thermoplastic elastomeric materials. Thermoplastic elastomeric materials are generally defined as materials that act as though they were covalently crosslinked at ambient temperatures, exhibiting high resilience and low creep, yet process like thermoplastic nonelastomers and flow when heated above their softening point. Thermoplastic elastomeric materials useful in the multilayer films of the present invention include, for example, linear, radial, star, and tapered block copolymers (e.g., styrene-isoprene block copolymers, styrene-(ethylene-butylene) block copolymers, styrene-(ethylene-propylene) block copolymers, and styrene-butadiene block copolymers); polyetheresters such as that available under the trade designation HYTREL from E.I. DuPont de Nemours, Inc.; elastomeric ethylene-propylene copolymers; thermoplastic elastomeric polyurethanes such as that available under the trade designation MORTHANE from Morton International, Inc., Chicago, Ill.; polyvinylethers; poly-α-olefin-based thermoplastic elastomeric materials such as those represented by the formula —$(CH_2CHR)_x$ where R is an alkyl group containing 2 to 10 carbon atoms, and poly-α-olefins based on metallocene catalysis such as AFFINITY, ethylene/poly-α-olefin copolymer available from Dow Plastics Co., Midland, Mich.

The multilayer films are typically prepared by melt processing (e.g., extruding). In a preferred method, the foam and non-foam layers are generally formed at the same time, joined while in a molten state, and cooled. That is, preferably, the layers are substantially simultaneously melt-processed, and more preferably, the layers are substantially simultaneously coextruded. Products formed in this way possess a unified construction and have a wide variety of useful, unique, and unexpected properties, which provide for a wide variety of useful, unique, and unexpected applications.

The ink receptive substrate may also have an optional tie layer between the foam layer, non-foam layers or ink-receptive polymer layer to improve adherence between the two. Useful tie layers include extrudable polymers such as ethylene vinyl acetate polymers, and modified ethylene vinyl acetate polymers (modified with acid, acrylate, maleic anhydride, individually or in combinations). The tie layer may consist of these materials by themselves or as blends of these polymers with the thermoplastic polymer component. Use of tie layer polymers is well known in the art and varies depending on the composition of the two layers to be bonded. Tie layers for extrusion coating could include the same types of materials listed above and other materials such as polyethyleneimine which are commonly used to enhance the adhesion of extrusion coated layers. Tie layers can be applied to the foam layer, non-foam layer or ink absorptive layer by coextrusion, extrusion coating, laminating, or solvent coating processes.

Preferably, the foam layers of multilayer articles range in thickness from about 20 to about 100 mils thick (~500 to 2500 micrometers (μm)). Each non-foam layer of a multilayer substrate may range from 1 to 40 mils (~25 to 1000 micrometers). If the non-foam layer is an internal stiffening layer, the thickness is generally from about 10 to 30 mils (~250 to 750 micrometers). If the non-foam layer is a ink-receptive thermoplastic film layer, the thickness is generally from about 1 to 4 mils (~25 to 100 micrometers). The overall thickness of a multilayer article may vary depending on the desired end use, but for security documents, the thickness is generally from about 20 to 120 mils (~500 to 3050 micrometers), prior to orientation. The post-orientation thickness will be less. The thickness (or volume fraction) of the multilayer article and the individual film and foam layers depend primarily on the end-use application and the desired composite mechanical properties of the multi-layered film. Such multilayer articles have a construction of at least 2 layers, preferably, at least 3 layers.

Depending on the polymers and additives chosen, thicknesses of the layers, and processing parameters used, the multilayer articles will typically have different properties at different numbers of layers. That is, the same property (e.g., tensile strength, modulus, bending stiffness, tear resistance) may go through maximum at a different number of layers for two particular materials when compared to two other materials. For example, the foam layer generally has good tear propagation resistance, but poorer tear initiation resistance. Thermoplastic films generally have good tear initiation resistance, but poorer tear propagation resistance. A multilayer article having both a foam and thermoplastic film layer provides both desirable attributes. Each of the non-foam layers typically includes the same material or combination of materials, although they may include different materials or combinations of materials.

Preferably the non-foam layer is a thermoplastic film layer when enhanced bending stiffness is desired. The bending stiffness may be enhanced by in internal or external layer, but is preferably an internal layer in a multilayer article. Bending stiffness may be measured using a Handle-O-Meter™ using the test method described in the Examples section. The bending stiffness of the multilayer article is preferably at least 2 times the bending stiffness of the foam layer per se, and is most preferably at least 40 N as measured using the Handle-O-Meter™. Such a value is comparable to paper security substrates.

Stiff materials useful in enhancing the bending stiffness comprise amorphous and semicrystalline thermoplastic homo- and copolymers (and mixtures and blends thereof). Particularly useful materials include particle filled polyolefins such as particle filled polypropylene, particularly polypropylene containing 10 to 40 weight %, $TiO_2$, $CaCO_3$, or high aspect fillers such as wollastonite, mica, or glass fibers.

Examples of other useful stiff materials include homo- and copolymers of methyl methacrylate, styrene, alkyl styrenes such as α-methyl styrene, acrylonitrile and methacrylonitrile, copolymers of ethylene and vinyl alcohol (such as EVOH), polyesters, polyamides, polyurethanes; copolymers of ethylene and cyclic olefins, such as ethylene-norbornene copolymers (such a Zeonex™), certain high modulus polypropylenes and polycarbonates.

In a preferred method in accordance with the present invention, printed indicia, such a characters, images, text, logos, etc., are applied to the ink receptive layer utilizing a printing process. Many inks may be utilized in conjunction with the present invention including organic solvent-based inks, water-based inks, phase change inks, and radiation polymerizable inks. Depending on the printing technique used, preferred inks may include water-based inks. Inks utilizing various colorants may be utilized in conjunction with the present invention. Examples of colorants, which may be suitable in some applications, include dye-based colorants, and pigment based colorants. Examples of printing methods, which may be suitable include laser printing, gravure printing, offset printing, silk screen printing, electrostatic printing, intaglio and flexographic printing.

The ink-receptive article preferably includes one or more security features. A number of security features have been developed to authenticate security documents, thus preventing forgers from producing a document, which resembles the authentic document during casual observation, but lacks the overt or covert security features known to be present in the authentic document. Overt security features include holograms and other diffractive optically variable images, transparent or translucent regions, embossed images, watermarks and color-shifting films or inks, while covert security features include images only visible under certain conditions such as inspection under light of a certain wavelength, polarized light, or retroreflected light. Even more sophisticated systems require specialized electronic equipment to inspect the document and verify its authenticity.

Examples of security indicia that may be suitable in some applications include a picture of a human face, serial numbers, a representation of a human fingerprint, a bar code, color shifting inks or films, embossments, holographic indicia, transparent regions, and a representation of a cardholder's signature and the like. One particularly useful security indicia comprises an embodiment wherein a colorant is added to a thermoplastic film layer in an embossed foam/film/foam construction. Normally, due to the opacity of the foam layers, the colorant in the film layer is not readily visible. However, on embossing one or both of the foam layers, a translucent region is created and the colored film is revealed.

Embossing can significantly reduce the light scattering from the foam cell/polymer interfaces, leading to translucent or nearly transparent areas. Through the choice of embossing tooling, some areas containing indicia may remain unembossed (still substantially opaque), while other areas are substantially transparent, allowing verification in reflected or transmitted light. The transparency of the embossed indicia and the consistency of the light scattering in the unembossed regions are useful in determining that counterfeiting via the addition of a transparent film was not attempted. Other methods of reducing the light scattering of the foams are contemplated including vacuum, pressurized jets, peening, impingement with dot matrix print heads, and localized melting. Embossing of the article can provide a tactile security feature, which is desirable by the visually impaired.

In a foam/film/foam construction, the embossing may reveal the center film. The center film may contain transparent colored dyes, or opaque colored pigments, which may be easily differentiated when the security document is held up to view in transmitted light. Additionally, if the film is a multilayer optical film as described in U.S. Pat. No. 5,882,774 (Jonza et al.) or Assignee's copending U.S. patent application Ser. No. 10/139,893 filed May 6, 2002 (Hebrink et al.) this will be revealed more fully in the embossed regions, where foam cells are collapsed. Advantageously the multilayer optical film may be oriented at the same temperature as the polypropylene foams, allowing for economical, one-step manufacturing. Alternatively, the film need not be continuous if it is placed inside the foam layers via lamination. In another embodiment, printing on the internal surface(s) with ordinary or security inks may be done prior to laminating foam layers together.

If desired, coating the article with a white opacifying coating and using security printing inks is anticipated. Generally, an opacifying agent such as $TiO_2$ or $CaCO_3$ may be added to the ink-receptive coating. However, the foam layer, because the small foam cell size and scattering of incident light is inherently opacifying, additional opacifying agents may not be necessary. If desired, some regions may remain uncoated to allow for transparent or translucent regions of be embossed on the article, by the application of heat and/or pressure, which at least partially melts the foam layer and collapses the cells.

The placement of the transparent region(s) is a security feature. Some of these transparent regions, or windows, may lack opacifying coatings on both sides, for viewing the transmitted light. Other windows may have no coating on one side, and a white or black coating on the opposite side.

Other security features may also be practiced, such as hot stamping of holograms (transparent or aluminum vapor coated), printing with color shifting and/or magnetic inks, and laser ablation to produce small holes that become apparent when held to a strong backlight.

As previously described, the oriented, high melt-strength polypropylene foam may be prepared by the steps of:

(1) mixing at least one high melt strength polypropylene and at least one blowing agent in an apparatus having an exit shaping orifice at a temperature and pressure sufficient to form a melt mixture wherein the blowing agent is uniformly distributed throughout the polypropylene;

(2) reducing the temperature of the melt mixture at the exit of the apparatus to an exit temperature that is no more than 30° C. above the melt temperature of the neat polypropylene while maintaining the melt mixture at a pressure sufficient to prevent foaming;

(3) passing the mixture through said exit shaping orifice and exposing the mixture to atmospheric pressure, whereby the blowing agent expands causing cell formation resulting in foam formation, and (4) orienting said foam.

The foams thus produced have an average cell sizes less than 100 micrometers, and advantageously may provide foams having average cell sizes less than 50 micrometers, prior to the orientation step. Additionally the foams produced have a closed cell content of 70 percent or greater. As result of extrusion, and subsequent orientation, the original spherical cells may be elongated in the machine direction to assume an oblate ellipsoidal configuration.

An extrusion process using a single-screw, double-screw or tandem extrusion system may prepare the foams of the present invention. This process involves mixing one or more high melt strength propylene polymers (and any optional polymers to form a propylene polymer blend) with a blowing agent, e.g., a physical or chemical blowing agent, and heating to form a melt mixture. The temperature and pressure conditions in the extrusion system are preferably sufficient to maintain the polymeric material and blowing agent as a homogeneous solution or dispersion. Preferably, the polymeric materials are foamed at no more than 30° C. above the melting temperature of the neat polypropylene thereby producing desirable properties such as uniform and/or small cell sizes.

When a chemical blowing agent is used, the blowing agent is added to the neat polymer, mixed, heated to a temperature above the $T_m$ of the polypropylene (within the extruder) to ensure intimate mixing and further heated to the activation temperature of the chemical blowing agent, resulting in decomposition of the blowing agent. The temperature and pressure of the system are controlled to maintain substantially a single phase. The gas formed on activation is substantially dissolved or dispersed in the melt mixture. The resulting single-phase mixture is cooled to a temperature no more than 30° C. above the melting temperature of the neat polymer, while the pressure is maintained at or above 1000 psi (6.9 MPa), by passing the mixture through a cooling zone(s) in the extruder prior to the exit/shaping die. Generally the chemical blowing agent is dry blended with the neat polymer prior to introduction to the extruder, such as in a mixing hopper.

With either a chemical or physical blowing agent, as the melt mixture exits the extruder through a shaping die, it is exposed to the much lower atmospheric pressure causing the blowing agent (or its decomposition products) to expand. This causes cell formation resulting in foaming of the melt mixture. When the melt mixture exit temperature is at or below 30° C. above the $T_m$ of the neat polypropylene, the increase in $T_m$ of the polymer as the blowing agent comes out of the solution causes crystallization of the polypropylene, which in turn arrests the growth and coalescense of the foam cells within seconds or, most typically, a fraction of a second. This preferably results in the formation of small and uniform voids in the polymeric material. When the exit temperature is no more than 30° C. above the $T_m$ of the neat polypropylene, the extensional viscosity of the polymer increases as the blowing agent comes out of the solution and the polypropylene rapidly crystallizes. When a high melt strength polypropylene is used, the extensional thickening behavior is especially pronounced. These factors arrest the growth and coalescense of the foam cells within seconds or, most typically, a fraction of a second. Preferably, under these conditions, the formation of small and uniform cells in the polymeric material occurs. When exit temperatures are in excess of 30° C. above the $T_m$ of the neat polymer, cooling of the polymeric material may take longer, resulting in non-uniform, unarrested cell growth. In addition to the increase in $T_m$, adiabatic cooling of the foam may occur as the blowing agent expands.

Either a physical or chemical blowing agent may plasticize, i.e., lower the $T_m$ and $T_g$ of, the polymeric material. With the addition of a blowing agent, the melt mixture may be processed and foamed at temperatures considerably lower than otherwise might be required, and in some cases may be processed below the melt temperature of the high melt strength polypropylene. The lower temperature can allow the foam to cool and stabilize i.e., reach a point of sufficient solidification to arrest further cell growth and produce smaller and more uniform cell sizes.

Chemical blowing agents are added to the polymer at a temperature below that of the decomposition temperature of the blowing agent, and are typically added to the polymer feed at room temperature prior to introduction to the extruder. The blowing agent is then mixed to distribute it throughout the polymer in undecomposed form, above the melt temperature of the polypropylene, but below the activation temperature of the chemical blowing agent. Once dispersed, the chemical blowing agent may be activated by heating the mixture to a temperature above its decomposition temperature of the agent. Decomposition of the blowing agent liberates gas, such as $N_2$, $CO_2$ and/or $H_2O$, yet cell formation is restrained by the temperature and pressure of the system. Useful chemical blowing agents typically decompose at a temperature of 140° C. or above and may include decomposition aides. Blends of blowing agents may be used.

Examples of such materials include synthetic azo-, carbonate-, and hydrazide-based molecules, including azodicarbonamide, azodiisobutyronitrile, benzenesulfonhydrazide, 4,4'-oxybenzene sulfonyl-semicarbazide, p-toluene sulfonyl semi-carbazide, barium azodicarboxylate, N,N'-dimethyl-N, N'-dinitrosoterephthalamide and trihydrazino triazine. Specific examples of these materials are Celogen OT (4,4' oxy-bisbenzenesulfonylhydrazide), Hydrocerol BIF (preparations of carbonate compounds and polycarbonic acids), Celogen AZ (azodicarbonamide) and Celogen RA (p-toluenesulfonyl semicarbazide). Other chemical blowing agents include endothermic reactive materials such as sodium bicarbonate/citric acid bends that release carbon dioxide. Specific examples include Reedy International Corp SAFOAM™ products.

The amount of blowing agent incorporated into the foamable polymer mixture is chosen to yield a foam having a void content in excess of 10%, more preferably in excess of 20%, as measured by density reduction. Generally, greater foam void content reduces the foam density, weight and material costs for subsequent end uses.

A single stage extrusion apparatus can be used to make the foams, and is the preferred process for use with chemical blowing agents. A twin-screw extruder may be used to form a melt mixture of the polypropylene and blowing agent, although it will be understood that a single screw extruder may also be used. The polypropylene is introduced into an extruder by means of a hopper. Chemical blowing agents are typically added with the polymer but may be added further downstream. A physical blowing agent may be added using fluid handling means at a location downstream from a point at which the polymer has melted.

When a chemical blowing agent is used, an intermediate zone is generally maintained at an elevated temperature sufficient to initiate the chemical blowing agent, followed by subsequent cooler zones. The temperature of the initial zone(s) of the extruder must be sufficient to melt the polypropylene and provide a homogenous melt mixture with the blowing agent(s). The final zone or zones of the extruder are set to achieve the desired extrudate exit temperature. Using a single stage extrusion process to produce a homogeneous foamable mixture requires mixing and transitioning from an operating temperature and pressure to an exit temperature and pressure over a shorter distance. To achieve a suitable melt mix, approximately the first half of the extruder screw may have mixing and conveying elements which knead the polymer and move it through the extruder. The second half of the screw may have distributive mixing elements to mix the polymer material and blowing agent into a homogeneous mixture while cooling.

The operating and exit pressures (and temperatures) should be sufficient to prevent the blowing agent from causing cell formation in the extruder. The operating temperature is preferably sufficient to melt the polymer materials, while the last zone or zones of the extruder are preferably at a temperature that will bring the extrudate to the exit temperature.

At the exit end of the extruder, the foamable, extrudable composition is metered into a die having a shaping exit orifice. In general, as the blowing agent separates from the melt mixture, its plasticizing effect on the polymeric material decreases and the shear viscosity and elastic modulus of the polymeric material increases. The shear viscosity increase is much sharper at the $T_m$ than at the $T_g$, making the choice of foaming temperatures for semicrystalline polymers much more stringent than for amorphous polymers. As the temperature of the polymeric material approaches the $T_m$ of the neat polymer and becomes more viscous, the cells cannot as easily expand or coalesce. As the foam material cools further, it solidifies in the general shape of the exit-shaping orifice of the die.

The blowing agent concentrations, exit pressure, and exit temperature can have a significant effect on the properties of the resulting foams including foam density, cell size, and distribution of cell sizes. In general, the lower the exit temperature, the more uniform, and smaller the cell sizes of the foamed material. This is because at lower exit temperatures, the extensional viscosity is higher, yielding slower cell growth. Extruding the material at lower than normal extrusion temperatures, i.e. no more than 30° C. above the $T_m$ of the neat polymeric material, produces foams with small, uniform cell sizes.

In general, as the melt mixture exits the die, it is preferable to have a large pressure drop over a short distance. Keeping the solution at a relatively high pressure until it exits the die helps to form uniform cell sizes. Maintaining a large pressure drop between the exit pressure and ambient pressure can also contribute to the quick foaming of a melt mixture. The lower limit for forming a foam with uniform cells will depend on the particular blowing agent/polymer system being used. In general, for the high melt strength polypropylene useful in the invention, the lower exit pressure limit for forming acceptably uniform cells is approximately 7 MPa (1000 psi), preferably 10 MPa (1500 psi), more preferably 14 MPa (2000 psi). The smallest cell sizes may be produced at low exit temperatures and high blowing agent concentrations. However at any given temperature and pressure, there is a blowing agent concentration at and above which polydispersity will increase because the polymer becomes supersaturated with blowing agent and a two phase system is formed.

The optimum exit temperature, exit pressure, and blowing agent concentration for a particular melt mixture will depend on a number of factors such as the type and amount of polymer(s) used; the physical properties of the polymers, including viscosity; the mutual solubility of the polymer(s) and the blowing agent; the type and amount of additives used; the thickness of the foam to be produced; the desired density and cell size; whether the foam will be coextruded with another foam or an unfoamed material; and the die gap and die orifice design.

Further details regarding the preparation of the high melt strength oriented foams may be found in Assignee's published application WO02/00412, which claims priority to patent application U.S. Ser. No. 09/602,032, now abandoned.

In order to optimize the physical properties of the foam, the polymer chains need to be oriented along at least one major axis (uniaxial), and may further be oriented along two major axes (biaxial). The degree of molecular orientation is generally defined by the draw ratio, that is, the ratio of the final length to the original length.

Upon orientation, greater crystallinity is imparted to the polypropylene component of the foam and the dimensions of the foam cells change. Typical cells have major directions X and Y, proportional to the degree of orientation in the machine and transverse direction respectively. A minor direction Z, normal to the plane of the foam, remains substantially the same as (or may be moderately less than) the cross-sectional dimension of the cell prior to orientation and therefore the density of the foam decreases with orientation. Subsequent to orientation, the cells are generally oblate ellipsoidal in shape.

The conditions for orientation are chosen such that the integrity of the foam is maintained. Thus when stretching in the machine and/or transverse directions, the orientation temperature is chosen such that substantial tearing or fragmentation of the continuous phase is avoided and foam integrity is maintained. The foam is particularly vulnerable to tearing, cell rupture or even catastrophic failure if the orientation temperature is too low or the orientation ratio(s) is/are excessively high. Generally the foam is oriented at a temperature between the glass transition temperature and the melting temperature of the neat polypropylene. Preferably, the orientation temperature is above the alpha transition temperature of the neat polymer. Such temperature conditions permit optimum orientation in the X and Y directions without loss of foam integrity.

After orientation the cells are relatively planar in shape and have distinct boundaries. Cells are generally coplanar with the major surfaces of the foam, with major axes in the machine (X) and transverse (Y) directions (directions of orientation). The sizes of the cells are uniform and proportional to concentration of blowing agent, extrusion conditions and degree of orientation. The percentage of closed cells does not change significantly after orientation when using high melt strength polypropylene. In contrast, orientation of conventional polypropylene foam results in cell collapse and tearing of the foam, reducing the percentage of closed cells. Cell size, distribution and amount in the foam matrix may be determined by techniques such as scanning electron microscopy. Advantageously, the small cell sizes increase the opacity of the foam article, compared to foams having larger cell sizes, and opacifying agents may not be required.

In the orienting step, the foam is stretched in the machine direction and may be simultaneously or sequentially stretched in the transverse direction. The stretching conditions are chosen to increase the crystallinity of the polymer matrix and the void volume of the foam. It has been found that an oriented foam has significantly enhanced tensile strength, even with a relatively low density when compared to unoriented foams.

The foam may be biaxially oriented by stretching in mutually perpendicular directions at a temperature above the alpha transition temperature and below the melting temperature of the polypropylene. Generally, the film is stretched in one direction first and then in a second direction perpendicular to the first. However, stretching may be effected in both directions simultaneously if desired. If biaxial orientation is desired, it is preferable to simultaneously orient the foam, rather than sequentially orient the foam along the two major axes. It has been found that simultaneous biaxial orientation provides improved physical properties such as tensile strength and tear resistance as compared to sequential biaxial orientation, and enables the preparation of a foam/non-foam multilayer construction where the non-foam layer is a lower melting polymer. This simultaneous biaxial orientation may be done on either a flat or tubular film line.

Multilayer articles comprising the simultaneous biaxially oriented foam are also within the scope of the invention. However, a foam layer may be prepared, oriented and subsequently laminated to a separately prepared oriented or unoriented thermoplastic film layer. If a multilayer article comprises a foam/ink-receptive polymer layer is desired, it is preferable to coextrude the layers and simultaneously biaxially orient the composite article.

In a typical sequential orientation process, the film is stretched first in the direction of extrusion over a set of rotating rollers, and then is stretched in the direction transverse thereto by means of a tenter apparatus. Alternatively, foams may be stretched in both the machine and transverse directions in a tenter apparatus. Foams may be stretched in one or both directions 3 to 70 times total draw ratio (MD×CD). Generally greater orientation is achievable using foams of small cell size; foams having cell size of greater than 100 micrometers are not readily oriented more than 20 times, while foams having a cell size of 50 micrometers or less could be stretched up to 70 times total draw ratio. In addition foams with small average cell size exhibit greater tensile strength, enhanced bending, opacity and elongation to break after stretching.

The temperature of the polymer foam during the first orientation (or stretching) step affects foam properties. Generally, the first orientation step is in the machine direction. Orientation temperature may be controlled by the temperature of heated rolls or by the addition of radiant energy, e.g., by infrared lamps, as is known in the art. A combination of temperature control methods may be utilized. Too low an orientation temperature may result in tearing the foam and rupturing of the cells. Too high an orientation temperature may cause cell collapse and adhesion to the rollers. Orientation is generally conducted at temperatures between the glass transition temperature and the melting temperature of the neat polypropylene, or at about 110-170° C., preferably 110-140° C. A second orientation, in a direction perpendicular to the first orientation may be desired. The temperature of such second orientation is generally similar to or higher than the temperature of the first orientation.

After the foam has been stretched it may be further processed. For example, the foam may be annealed or heat-set by subjecting the foam to a temperature sufficient to further crystallize the polypropylene while restraining the foam against retraction in both directions of stretching.

If desired, transparent or translucent regions may be imparted to the foam article or the multilayer article by embossing the article under heat and/or pressure by techniques known in the art. This embossing step is preferably performed on the oriented article. The embossing collapses the cells of the foam layer resulting in a transparent or translucent region that resists photocopying.

The final thickness of the foam will be determined in part by the extrusion thickness, the degree of orientation, and any additional processing. The process provides thinner foams than are generally achievable by prior art processes. Most foams are limited in thickness by the cell size. The small cell sizes (<50 micrometers) in combination with the orientation allows foam thickness of 1 to 100 mils (~25 to 2500 micrometers) and greater opacity than larger cell foams. For security document applications, it is preferred that the thickness of the oriented foam layer(s) be from about 1 to 10 mils (~25 to 259 micrometers), preferably 2 to 6 mils (~50 to 150 micrometers).

The oriented foam layer of the ink-receptive substrate, when prepared by the methods described herein and further described in Assignee's published application WO02/00412, have two foam surfaces; i.e. have a foam morphology at both major surfaces. Such a foam surface will not preclude a foam skin surface that is the result of localized melting of the foam during production. Further, the surfaces of the foam layer are substantially smooth, i.e. one that is substantially continuous and free of visible features in reflected light by visual observation of the foam surface at a wide variety of possible angles. Visual features that may be observed include but are not limited to pock marks, lumps, fibrous structures, sharp or angular protrusions and/or indentations or substantial waviness, or other non-cellular visual indicators known to one of ordinary skill in foam production. Typically, visual observation is accomplished by looking at the reflection of a light source from the foam surface at an angle of about 60 degrees from perpendicular.

The present invention may be used to produce multilayer articles comprising at least one high melt strength polypropylene foam layer. The foams may be coextruded with materials having substantially higher or lower processing temperatures from that of the foam, while still obtaining the desired structures and cell sizes. It would be expected that exposing the foam to an adjacent hot polymer as it is extruded, might cause the foam cells, especially those in direct contact with the hotter material, to continue to grow and coalesce beyond their desired sizes or might cause the foam material to melt or collapse. The foams may be coextruded with a non-foam thermoplastic polymer layer, or may be coextruded with an ink-receptive layer.

Alternatively, the foam layer may be bonded, laminated or otherwise affixed to a separately prepared thermoplastic polymer film layer or ink-receptive layer. The foam layer may also be melt coated with a thermoplastic polymer film layer or ink-adhesive layer.

The coextrusion process of the present invention may be used to make a foam material comprising two layers or more. A layered material or article may be produced by equipping a die with an appropriate feedblock, e.g., a multilayer feedblock, or by using a multi-vaned or multi-manifold die such as a 3-layer vane die available from Cloeren, Orange, Tex. Materials or articles having multiple adjacent foam layers may be made with foam layers comprising the same or different materials. Foam articles of the present invention may comprise one or more interior and/or exterior foam layer(s). In such a case, each extrudable material, including the high melt strength polypropylene foamable material, may be processed using one of the above-described extrusion methods wherein melt mixtures are fed to different inlets on a multi-layer feedblock, or multi-manifold die, and are brought together prior to exiting the die. The multi-layer process can also be used to extrude the foam of this invention with other types of materials such as thermoplastic films and tie layers. When a multi-layered article is produced, it is preferable to form adjacent layers using materials having similar viscosities and which provide interlayer adhesion. When the multilayer article comprises a foam layer and a film layer (on one or both surfaces), greater degrees of orientation, and improved tensile properties, may be possible than with single layer foam.

Multilayer foam articles can also be prepared by laminating nonfoam layers to a foam layer, or by layering extruded foams as they exit their respective shaping orifices, with the use of some affixing means such as an adhesive. Useful laminated constructions include the high melt strength polypropylene foam layer with a thermoplastic film layer or a scrim layer, such as a non-woven layer. Other techniques that can be used include extrusion coating and inclusion coextrusion, which is described in U.S. Pat. No. 5,429,856. The multilayer article may be oriented as previously described.

The ink-receptive surface may comprise an surface treatment, such as corona, plasma or flame-treatment of the foam or non-foam (film) surface, or may comprise an ink-receptive coating, such as a primer coating, on the foam surface, or may comprise a laminated or coextruded polymer film that is ink-receptive.

Nitrogen corona treatment can be carried out on any commercial corona treater as will be known to those skilled in the art. The corona area is purged with nitrogen, to an oxygen concentration of less than 200 ppm and preferably less than 50 ppm. The corona energy should be between 0.1 and 5.0 J/cm$^2$. The temperature of the polypropylene foam substrate during nitrogen corona treatment should be above the glass transition temperature of the film but less than the melting point of the film, preferably at room temperature.

The preferred oxygen concentration, at the corona, for this process, is less than 200 ppm and most preferred less than 20 ppm. A side benefit of these low oxygen concentrations, is that no environmental control of emissions is necessary because of the low levels of $NO_x$ and $O_3$ produced.

Flame treatment can be carried out on any commercial gas flaming equipment known to those skilled in the art. Either high-velocity or ribbon burners may be used. The air:fuel ratio of the combustion mixture must be less than the stochiometric ratio (typically 9.6 for air:natural gas mixtures) and preferably between 8.8 and 9.4 by volume. This air:fuel mixture produces a so-called "reducing" or "rich" flame. Although natural gas with an energy value of approximately 1000 BTU/ft$^3$ is the preferred fuel, other gaseous hydrocarbons such as acetylene, ethane, propane, butane, or liquefied petroleum gas (LPG) can also be used, provided that the air:fuel ratio is adjusted to less than stochiometric. Although air is the preferred oxidizer, oxygen or oxygen-enriched air can be used, again provided that the air:fuel ratio is adjusted to less than stochiometric.

The desired flow rate of fuel may be adjusted to provide the optimal thermal output for a given width, thickness, and processing speed of the polypropylene foam backing. The volume of gas burned should be 0.4-6.0 liters of natural gas per square meter of polypropylene foam to be flamed, and preferably between 0.6-1.5 liters of natural gas/m$^2$ polypropylene foam. Exposure times to the flame should be between 0.001-0.05 seconds to prevent thermal damage to the polypropylene foam.

Flame treating equipment that may be suitable in some applications is commercially available from Flynn Burner Corporation of New Rochelle N.Y., USA, The Aerogon Company Ltd. of Alton, United Kingdom; and Sherman Treaters Ltd. of Thame, United Kingdom. Corona treating equipment which may be suitable in some applications is commercially available from Enercon Industries Corporation of Menomonee Falls, Wis., USA; Pillar Technologies of Hartland, Wis., USA; and Corotec Corporation of Farmington, Conn., USA.

When using a ink-receptive coating on an oriented foam substrate, the ink receptive layer has a weight of between about 0.5 and about 250 g/m$^2$. In a preferred embodiment, the image receptive layer has a weight of between about 1 and about 100 g/m$^2$. In a particularly preferred embodiment, the image receptive layer has a weight of between about 2 and about 50 g/m². It is to be appreciated that the coating weight can vary depending on fillers, inorganic materials, additives, etc.

Examples of application techniques for the ink receptive coating, which may be suitable in some applications, include coating, printing, dipping, spraying, and brushing. Examples of coating processes that may be suitable in some applications include direct and reverse roll coating, knife coating, spray coating, flood coating, and extrusion coating. Examples of printing processes that may be suitable in some applications include screen-printing, flexographic and gravure printing.

A coating solution of the ink-receptive layer may include a thickener. In particular the thickener may be selected to provide a combination of high viscosity at low shear rates and low viscosity at high shear rates. Examples of thickeners that may be suitable in some applications include: starch, gum arabic, guar gum, and carboxymethylcellulose. Additionally, the coating solution may further comprise an opacifying agent, such as has been described and is known in the art.

The coating solution may include various solvents without deviating from the spirit and scope of the present invention. In a preferred embodiment, the solvent and the particles of the coating solution are selected so that the particles are substantially insoluble in the solvent. Preferable solvents comprise water and/or glycol ethers (e.g., diethylene glycol).

In some applications it may be advantageous to include a surfactant in the coating solution to aid in wetting the substrate. Examples of surfactants that may be suitable in some applications include anionic surfactants, cationic surfactants, nonionic surfactants, and zwitterionic surfactants. Examples of trade designations for surfactants include ZONYL and FLUORAD. ZONYL FSN is a trade designation for a fluorinated surfactant available from E.L Du Pont de Nemours Corporation of Wilmington, Del., USA. FLUORAD FC-754 WELL STIMULATION ADDITIVE is a trade designation for a fluorinated surfactant available from Minnesota Mining and Manufacturing (3M Company) of St. Paul, Minn., USA.

Useful surfactants for application of the ink receptive coating by screen printing techniques may be cationic, anionic, nonionic. A preferred surfactant for application by screen printing is a cationic surfactant. A useful solution for application by screen printing may comprise between about 0% and about 50% glycol ether. A preferred solution for application by screen printing may comprise between about 5% and about 40% glycol ether. A particularly preferred solution for application by screen printing may comprise between about 10% and about 35% glycol ether.

Test Methods

Foam Density (ASTM D792-86)

Foam samples were cut into 12.5 mm×12.5 mm specimens and weighed on a high precision balance available as Model AG245 from Mettler-Toledo, Greifensee, Switzerland. The volume of each sample was obtained by measuring the mass of water displaced at room temperature (23±1° C.). The buoyancy of each sample was measured in grams using a special attachment for the balance. The density of the foam was taken to be its mass divided by its buoyancy, assuming the density of water at 23° C. to be 1 g/cm³. Accuracy of this measurement is ±0.02 g/cm³.

Foam Cell Size

Scanning electron microscopy was performed on all the foam samples using a scanning electron microscope available as model JSM-35C from JEOL USA, Inc., Peabody, Mass., operated at 5 and 10 kV. The samples were prepared by freezing in liquid nitrogen for 2-5 minutes and fracturing. A thin palladium-gold coating was evaporated on the samples to develop a conductive surface. The diameters of over 10 cells were measured and recorded.

Trouser Tear

Trouser tear tests were performed in order to measure tear propagation resistance at approximately 23° C. on a Sintech Testing Device (MTS, Research Triangle Park, N.C.). Samples were cut out into 57 mm×102 mm specimens, and their thicknesses were measured. Two slits, 25 mm apart and 32 mm long, were cut from one edge in a direction parallel to the long side. The tab created by doing this was then folded up and clamped in top clamp while the bottom two tabs were clamped in bottom clamp. The sample was pulled apart at 254 mm/min tearing along the tab created, and the average force was measured. The average tearing force is calculated for the middle 80% of crosshead travel and is the average load is divided by two, since there are two slits per sample. This was repeated at least five times for each sample.

Graves Tear

Graves tear tests were performed to measure a combination of tear propagation and initiation resistance at approximately 23° C. on a Sintech Testing Device. Samples were punched out using a specially shaped die, and their thicknesses were measured and recorded. The samples were approximately 100 mm long, 20 mm wide, and have a 90° notch in the middle along which the tear was initiated. The samples were clamped into the Sintech and pulled apart at 254 mm/min and a stress-strain curve was generated. The break stress, defined as the maximum stress on the curve, and the energy to break (ETB), defined as the area under the curve, was measured. This was repeated at least six times for each sample.

Bending Stiffness

Bending stiffness tests were performed at room temperature on a Handle-O-Meter testing device (Thwing-Alpert Instrument Company, Philadelphia, Pa.). Samples were cut out into 100 mm squares and their thicknesses was measured and recorded. Samples were forced through a 10 mm slit by a mechanical arm. The peak force required to do this was measured for each sample. This was repeated at least 6 times for each sample.

Printability/Ink Adhesion

Film samples were placed on a heating pad set at 80° C. and allowed to equilibrate for several minutes. Standard black currency ink, obtained from the United States Bureau of Engraving and Printing (BEP, Washington, D.C.), was spread on the surface of the film using a #6 Meyer rod at 80° C. The inked films were then aged for 3 hours at 75° C., accelerated conditions which have been shown to give similar ink drying and curing results as the 2 week, room temperature aging recommended by BEP. After drying, a 13 mm strip of masking tape (3M Company, St. Paul, Minn.) was rolled down using 3 passes of a 2 kg roller. The test tape was peeled immediately from the surface at a 90° angle and a rate of 2.8 m/min using a Slip/Peel Tester (Instrumenters, Inc., Strongsville, Ohio). The films were then rated qualitatively on a scale of 1 to 5 based on the amount of ink removed by the test tape, 1 for no ink removed and 5 for essentially all ink removed. Where noted, the dried and cured ink coating was scored with a set of parallel lines, using two parallel razor blades mounted 1.25 cm apart in a holder, then another set of parallel lines was scored to intersect with the first set at an angle of approximately 90 degrees. The ink test on a scored sample is considered a somewhat more demanding test, as compared with an unscored ink test.

Crumple Evaluation

To evaluate the crumple resistance and recovery of the banknotes or the potential banknote substrate materials, a new technique was developed. A modification was made to the Digimatic Indicator Model 1DF-112E (Mitutoyo, Japan), which measures the thickness of films. A 25.4 mm diameter polycarbonate disc of 7 mm thickness was made to fit over the 4.83 mm diameter shoe. This modification spreads the loading force over a larger area. Thus, for the same spring force, the stress pushing down to measure the film was 3.6% of the original force. For each 67×67 mm square, five measurements of the original film or paper thickness and the thickness of the sample following crumpling were recorded. These were done at the center and a position about 15 mm down and in from each corner. The crumpling of the samples was done with the IGT Crumple Tester, procured from Research North America, (Cherry Hill, N.J.). Eight crumples were done, rolling the sample alternately downweb and crossweb. The recovery of the crumpled samples was determined by placing the crumpled samples under precisely flat (<0.005 mm) stainless steel blocks providing a pressure on the sample of 0.7, 1.4 and 2.1 kPa on a machinist's granite table, with flatness of <0.005 mm, for 24 hr, then measuring the samples again in the 5 positions and averaging.

Opacity

The opacity of the samples was measured using a TCS II Spectrophotometer with a Color Sphere, Model 8860, available from BYK-Gardner USA, Silver Spring, Md. The test method used was TAPPI T-425.

Launderability

This film was laundered according to U.S. Bureau of Engraving and Printing Test Method STM 300.002.94a. The wash and rinse water temperature was 62° C.

EXAMPLE 1

A melt mixture of 67% high melt strength polypropylene (Profax PF814™, Montell North America, Inc., Wilmington, Del.), 28% elastomeric copolyethylene, Affinity 8200 (Dow Chemical, Midland, Mich.), and 5% by weight of FM1307H™ chemical blowing agent (50% azodicarbonamide loaded in polyethylene) (Ampacet Co., Cincinnati, Ohio) was prepared in a 5.1 cm single screw extruder (SSE) (Davis-Standard Corp., Cedar Grove, N.J.) equipped with a Saxton single stage screw at 60 rpm and a temperature profile from 135 to 221 to 141° C. The exit melt temperature was 141° C., creating an exit pressure of 11 MPa. The melt mixture was extruded into the core of a 203 mm single layer die at 160° C. with no skins. The resulting foam sheet was cooled on a chrome cast roll at 67° C., then collected at a draw rate of 2.5 m/min. The foam had a density of 0.5 g/cc at a thickness of 1.65 mm. A single layer foam was created with cell sizes slightly elongated in the machine direction (MD), the cells measuring approximately 20×80 micrometers and 40×60 micrometers in the cross direction (CD).

This foam was oriented in the machine direction (MD) using a length orienter (LO) and in the transverse direction (CD) using a tenter at a draw ratio of 3 (MD)×6 (CD). The temperature of the LO rolls was 130° C. and the tenter zones were all 158° C. The resulting oriented foam sample was designated sample A4-5. The density of the oriented foam was 0.50 g/cc. The oriented foam was opaque and had a paper-like feel due to the soft, skinless surface, as opposed to the plastic-like haptic properties of Securency™ banknotes, exemplified by Australian $5 bills (Securency Pty Ltd., Craigieburn, VIC, Australia). While the tear propagation properties of the foam (measured by trouser and Graves tear tests) are clearly an improvement over Securency™, this foam may be too limp for banknotes. It should be noted that the bending stiffness and tear properties of the foam would likely improve with printing. The tear and bending stiffness properties of this oriented foam were measured, and the results are presented in Table 1.

When subjected to the Crumple Evaluation, the sample was 173 micrometers thick in some spots, and remained 150 micrometers thick after smoothing with 2.1 kPa force, as compared to a thickness of 130 micrometers for the uncrumpled sample.

This foam was embossed using a hot press (Wabash MPI, Wabash, Ind.) at 80° C., 69 MPa using two raised "20" symbols engraved onto a mag plate (American Engraving, Minneapolis, Minn.). The circle diameter was 19 mm, the "2" was 9 mm×5 mm. The 20 symbols embossed very nicely into the foam, producing a transparent 20 embedded within the opaque substrate.

EXAMPLE 2

A melt mixture of 98.0% Profax PF814 and 2.0% FM1307H™ was prepared in a 60 mm twin screw extruder (Berstorff, Florence, Ky.) at 84 rpm and a temperature profile from 180 to 230 to 150° C. The exit melt temperature was 167° C., creating an exit pressure of 82.2 bar. The melt mixture was extruded into the core of an 457 mm 5-layer vane die at 175° C. A 64 mm Davis Standard SSE at 41 rpm and a 51 mm Davis Standard SSE at 75 rpm were used to feed into the die two skin layers, which consisted of isotactic polypropylene, PP 3571™ (Fina Inc., Dallas, Tex.). The resulting foam sheet was cooled on a partially water-immersed chrome cast roll at 20° C. at 3.1 m/min. A three-layer foam was created with foam cell sizes noticeably elongated in the machine direction, the cells measuring 20×80 micrometers. The skin/core/skin thickness ratio was approximately 12:76:12.

This foam was biaxially oriented in simultaneous fashion using a Bruckner LISIM line (Bruckner Inc.) at a draw ratio of 5.4 (MD)×4.7 (CD). The temperature of the tenter oven went from 174° C. to 161° C. to 154° C. to 151° C. The resulting oriented foam was designated as sample 257-7. The density of the oriented foam was 0.50 g/cc and the thickness was 95 micrometers. Due to the skins, the oriented foam had a glossier surface and a plastic-like feel, although it was still more paper-like than Securency™. The tear and bending stiffness properties of this oriented foam were measured, and the results are presented in Table 1.

While the bending stiffness is clearly improved by the addition of the thick skins, the tear properties are reduced by having thick polypropylene skins to near the Securency™ levels. It should be noted that this foam had the worst "crumple" properties of the foams; that is, after severe crumpling as described in the test method section, the foams were 254 micrometers thick in some spots, and remained 203 micrometers thick after smoothing with 2.1 kPa force, as compared to a thickness of 97 micrometers for the uncrumpled sample. However, this "worst" foam was still far superior to the crumple properties of Securency™, which increases to 559 micrometers with crumpling, smoothing to 356 micrometers with 2.1 Pa force, as compared to 130 micrometers for uncrumpled Securency™ film. This crumple problem with current plastic banknotes has been listed as a reason to remain with paper.

This foam was embossed using a hot press (Wabash) at 80° C., 69 MPa using two raised "20" symbols surrounded by circles engraved onto stainless steel (American Engraving).

The circle diameter was ¾", the "2" was 9 mm×5 mm. The 20 symbols embossed very nicely into the foam, causing a transparent 20 embedded within a roughened circle of the opaque substrate. The embossed symbols and texture could function as a tactile security feature.

The foam of this example was printed for ink adhesion using the unscored test method described above. Ink adhesion to this oriented foam was very poor (rating 5, or complete ink removal with tape), as would be expected. The foam was treated with nitrogen corona at 1 J/cm$^2$ and again tested the ink adhesion. The ink adhesion rated a 1 (no ink removal with tape) for the surface-treated sample, suggesting a continuous, environmentally friendly, low-cost way to improve the printability of these materials.

EXAMPLE 3

A melt mixture of 34.2% high melt strength polypropylene, Profax PF814™, 34.2% conventional polypropylene, PP 3376™ (Fina Inc., Dallas, Tex.), 29.2% elastomeric Affinity 8200™, and 2.4% by weight of FM1307H™ was prepared in a 6.3 cm single screw extruder (SSE, Davis-Standard) equipped with a Saxton single stage screw at 44.4 rpm and a temperature profile from 146 to 233 to 149° C. The exit melt temperature was 133° C., creating an exit pressure of 16.6 MPa. The melt mixture was extruded into the core of a 25.4 cm 3-layer vane die at 182° C. where it met the 50/50 PP 3571/PP 3376™ (Fina) skins. The skins were extruded from a 38.1 mm Davis Standard SSE running at 218° C., 100 rpm. The resulting foam sheet was cooled on a chrome cast roll at 17° C., then collected at a draw rate of 5.2 m/min. The foam had a density of 0.56 g/cc at a thickness of 1.3 mm.

This foam was oriented in the MD using an LO and in the CD using a tenter at a draw ratio of 2.5 (MD)×5.2 (CD). The temperature of the LO rolls was 135° C. and the tenter zones were all 166° C. The foam entered the LO at 1.8 m/min. The resulting oriented foam was given a sample designation of 1569-23. The density of the oriented foam was 0.39 g/cc. The film was quite opaque, and its tear propagation resistance is quite good, as can be seen in Table 1.

When subjected to the Crumple Evaluation, the sample was 155 micrometers thick in some spots, and remained 140 micrometers thick after smoothing with 2.1 kPa force, as compared to a thickness of 100 micrometers for the uncrumpled sample.

Note that while the bending stiffness is worse than that of Example 2, it is still an improvement over the unskinned foam of Example 1 and the tear properties are similar. The feel of the sample was a marked improvement over Securency™ and even Example 2, but was not quite as good as that of Example 1.

EXAMPLE 4

A melt mixture of 49% Profax PF814™, 34.5% PP 3376™, 15% elastomeric Affinity 8200™, and 1.5% FM1307H™ was prepared in a 6.3 cm single screw extruder (Davis-Standard) equipped with a Saxton single stage screw at 40 rpm and a temperature profile from 145 to 233 to 148° C. The exit melt temperature was 129° C., creating an exit pressure of 10.4 MPa. The melt mixture was split into two gear pumps (each at 60 rpm and 160° C.) through a "T" junction and sent into the skins of a 25.4 cm 3-layer vane die at 160° C. A 25 mm Berstorff twin screw extruder at 150 rpm with a gear pump running at 80 rpm fed into the die the core nonfoam layer, which consisted of 50/25/25 blend of Affinity 8200/PP 3376/Wollastonite 520S™ (Fibertec Inc., Bridgewater, Mass.), wollastonite being a clay filler of high aspect ratio used to increase the bending stiffness of the foam. This particular grade of wollastonite is silane surface treated to achieve good bonding to polypropylene so that little additional voiding should occur. The resulting foam sheet was cooled on a chrome cast roll at 38° C., and then collected at a draw rate of 2.9 m/min. The foam had a density of 0.65 g/cc at a thickness of 1.3 mm. A foam/non-foam/foam construction was created with balanced foam skins (40/20/40 thickness ratio). The foam cell sizes are slightly elongated, measuring approximately 20×60 micrometers in the MD and 40×40 micrometers in the CD.

This foam was oriented using an LO and tenter at a draw ratio of 2.5 (MD)×5.8 (CD) to a thickness of 102 micrometers. The temperature of the LO rolls was 135° C. and the tenter zones were all 166° C. The foam entered the LO at 1.2 m/min. The density of the oriented foam was 0.5 g/cc. The resulting oriented foam was given the designation of sample number 1588-30. The foam had a feel similar to that of Example 1, although its color was a unique opalescent blue due to the unfoamed colored clay-filled core. As can be seen from Table 1, the bending stiffness is considerably higher than that of Example 1 due to the presence of the middle unfoamed layer. In fact, the bending stiffness is even higher than that in Example 2 which has "stiff" PP skins on the outside of the foam. In addition, the foam feels more paper-like than that of Example 2 since there are no skin layers on this foam with tear properties very similar to or better than a new US $1 bill.

When subjected to the Crumple Evaluation, the sample was 155 micrometers thick in some spots, and remained 140 micrometers thick after smoothing with 2.1 kPa force, as compared to a thickness of 110 micrometers for the uncrumpled sample.

This oriented foam was embossed using an engraved roll featuring raised kangaroos. The embossing roll temperature was set at 77° C. and a 9 kg/cm nip was applied to the film passing by at 1.5 m/min. A kangaroo was embossed, and the regions of embossing were clear, unlike the opaque remainder of the foam.

The foam of this example was printed for ink adhesion using the test method described above. Ink adhesion to this oriented foam rated a 5.

EXAMPLE 5

A melt mixture of 43.5% Profax PF814™, 40% PP 3376™, 15% elastomeric Affinity 8200™, and 1.5% FM1307H™ was prepared in a 6.3 cm single screw extruder (Davis-Standard) equipped with a Saxton single stage screw at 40 rpm and a temperature profile from 138 to 224 to 148° C. The exit melt temperature was 137° C., creating an exit pressure of 15.9 MPa. Approximately half the melt mixture was split into a gear pump (at 60 rpm and 170° C.) through a "T" junction and fed into one skin of a 20.3 cm feedblock/die assembly at 182° C. The other half was fed directly from the "T" junction into the other skin layer. A 44.4 mm Davis Standard single screw extruder at 23 rpm fed into the die the core nonfoam layer, which consisted of 75/25 blend of PP 3376/Wollastonite 520S™. The resulting foam sheet was cooled on a chrome cast roll at 16° C., then collected at a draw rate of 2.0 m/min. The foam had a density of 0.7 g/cc at a thickness of 1.8 mm. A foam/non-foam/foam construction was created with balanced foam skins (40/20/40 thickness ratio). The foam cell sizes are slightly elongated, measuring, on average, less than 50 micrometers in diameter.

This foam was oriented using an LO and tenter at a draw ratio of 2.75 (MD)×5 (CD) to a thickness of 140 micrometers. The temperature of the LO rolls was 133° C. and the tenter zones were all 160° C. The density of the oriented foam was 0.55 g/cc. This film was designated with the sample number 02-0025-4. As can be seen from Table 5, the bending stiffness is considerably higher than that of Example 1 due to the presence of the middle unfoamed layer as well as the increased thickness and density. In addition, the foam feels more paper-like than that of Example 2 since there are no skin layers on this foam. Also, the foam features tear properties very similar to or better than a new US $1 bill. The results are reported in Table 1.

This oriented foam was embossed using an engraved roll with raised embossments between 25 and 140 micrometers in height. The embossing roll temperature was set at 91° C. and a 39 kg/cm nip was applied to the film passing by at 1.5 m/min. The images were embossed, with transparent indicia from the 140 micron features and a textured area from the shorter features. The textured embossed regions were slightly identifiable in reflected light and very identifiable in transmitted light, suggesting a watermark-type security feature. The remainder of the foam remained 94% opaque (a new US $1 bill is between 92 and 96% opaque for comparison), as measured using the opacity method described above.

The foam of this example was printed for ink adhesion using the test method described above. Ink adhesion to this oriented foam rated a 1. The foam was treated with nitrogen corona at 1 J/cm$^2$ and the ink adhesion tested. The ink adhesion rated a 1 for the surface-treated sample. When the samples were scored, the ink adhesion for the untreated sample rated a 4 while the treated sample rated a 3, showing a slight improvement in ink adhesion after the corona treatment.

Printed samples of this example were laundered as detailed above in the "Launderability" test method. Each sample was washed and dried 5 times, then examined for the amount of ink that had survived the laundering. The same scale described in the printability/ink adhesion test method was used to evaluate ink adhesion in this test, but no tape was used. The untreated sample rated a 4, while the corona treated sample rated a 2.

Printed samples of this example were crumpled as detailed above in the "Crumple Evaluation" test method. Each sample was crumpled 8 times, then examined for the amount of ink that had survived the crumpling. The same scale described in the printability/ink adhesion test method was used to evaluate ink adhesion in this test, but no tape was used. The untreated sample rated a 3, while the corona treated sample rated a 2.

EXAMPLE 6

A melt mixture of 43.5% Profax PF814™, 40% PP 3376™, 15% elastomeric Affinity 8200™, and 1.5% FM1307H™ was prepared in a 6.3 cm single screw extruder (Davis-Standard) equipped with a Saxton single stage screw at 40 rpm and a temperature profile from 138 to 224 to 148° C. The exit melt temperature was 137° C., creating an exit pressure of 16.6 MPa. Approximately half the melt mixture was split into a gear pump (at 60 rpm and 170° C.) through a "T" junction and fed into one skin of a 20.3 cm feedblock/die assembly at 182° C. The other half was fed directly from the "T" junction into the other skin layer. A 44.4 mm Davis Standard single screw extruder at 23 rpm fed into the die the core nonfoam layer, which consisted of 74/25/1 blend of PP 3376/Wollastonite 520S/Signal Green fluorescent colorant (Day-Glo, Cleveland, Ohio). The resulting foam sheet was cooled on a chrome cast roll at 16° C., then collected at a draw rate of 2.81 m/min. A foam/non-foam/foam construction was created with balanced foam skins (40/20/40 thickness ratio).

This foam was oriented using an LO and tenter at a draw ratio of 3 (MD)×4.5 (CD) to a thickness of 140 micrometers. The temperature of the LO rolls was 133° C. and the tenter zones were all 160° C. This oriented foam was designated sample number 02-0025-18. The oriented foam was embossed using an engraved roll with raised features between 25 and 140 micrometers in height. The embossing roll temperature was set at 91° C. and a 39 kg/cm nip was applied to the film passing by at 1.5 m/min. The images were embossed, with transparent indicia from the 140-micron features and a textured area from the shorter features. The textured embossed regions were slightly identifiable in reflected light and very identifiable in transmitted light, suggesting a watermark-type security feature.

The fluorescent colorant in the outer foam layers was added as a covert security feature, being undetectable under ambient lighting conditions but fluorescing a bright green color when irradiated with a UV light. Under UV light inspection, there was heightened contrast between the embossed and unembossed regions, the embossed regions appearing darker against the bright green background.

EXAMPLE 7

The coextruded foam of Example 4 was coated with an ink receptive coating after 1 J/cm$^2$ N$_2$ corona treatment. The coating was a #12 wire wound rod draw down of XFP-10021 Gravure Laminating White Ink, Product Code 088-T1W00232 (Flint Ink, Ann Arbor, Minn.), dried for about 30 seconds with a heat gun. This is a white solvent-based ink recommended for use on polypropylene. The resulting coating was a brilliant white color with a semi gloss surface texture. When printed with standard black currency ink and tested as described above in the "Printability/Ink Adhesion" section, both unscored and scored ink samples rated a 1.

A printed sample of this example was laundered as detailed above in the "Launderability" test method. The sample was washed and dried 5 times, then examined for the amount of ink that had survived the laundering. The same scale described in the printability/ink adhesion test method was used to evaluate ink adhesion in this test, but no tape was used. The sample rated a 1.

EXAMPLE 8

The coextruded foam of Example 4 was coated with an ink receptive layer without any corona treatment. The coating was a #12 wire wound rod draw down of XFP-10021 Gravure Laminating White Ink, a white solvent-based ink recommended for use on polypropylene (Flint Ink, Product Code 088-T1W00232, Ann Arbor, Minn.), dried for about 30 seconds with heat. The resulting coating was a brilliant white color with a semi gloss surface texture. When printed with standard black currency ink and tested as above, the unscored sample rated a 3, while the scored sample rated a 5.

EXAMPLE 9

The coextruded foam of Example 4 was coated with an ink receptive coating after 1 J/cm$^2$ N$_2$ corona treatment. The coating was a #12 wire wound rod draw down of Laminating White M Ink, Product Code 088-T1W00233 (Flint Ink, Ann Arbor, Minn.), dried for about 30 seconds with a heat gun. This is a white solvent-based ink recommended for use on polypropylene. The resulting coating was a brilliant white color with a semi gloss surface texture. When printed with standard black currency ink and tested as above, the unscored sample rated a 2, while the scored sample rated a 4.

A printed sample of this example was laundered as detailed above in the "Launderability" test method. The sample was washed and dried 5 times, then examined for the amount of ink that had survived the laundering. The same scale described in the printability/ink adhesion test method was used to evaluate ink adhesion in this test, but no tape was used. The sample rated a 2.

EXAMPLE 10

The coextruded foam of Example 4 was coated with an ink receptive without any corona treatment. The coating was a #12 wire wound rod draw down of Laminating White M Ink, a white solvent-based ink recommended for use on polypropylene (Flint Ink, Product Code 088-T1W00233 Ann Arbor, Minn.), dried for about 30 seconds with heat. The resulting coating was a brilliant white color with a semi gloss surface texture. When printed with standard black currency ink and tested as above, the unscored sample rated a 1, while the scored sample rated a 5.

EXAMPLE 11

The coextruded foam of Example 4 was coated with an ink receptive coating after 1 $J/cm^2$ $N_2$ corona treatment. The coating consisted of the following components and dry weight percentages: 32.0% Chlorinated Polyolefin 343-1 (Eastman Chemical Co., Kingsport, Tenn.), 59.8% Tipure R960™ (titanium dioxide) (E.I. Dupont de Nemours & Co., Wilmington, Del.), 5.2% Desmophen 1300-75 (polyester polyol) (Bayer Corp., Pittsburgh, Pa.), 2.8% Desmodur N75 BA™/X (1,6 hexamethylene diisocyanate polymer) (Bayer Corp., Pittsburgh, Pa.), and 0.2% zinc octoate (ICN K&K Laboratories, Inc., Plainview, N.Y.). The zinc octoate was diluted to 10% solids in toluene, then the mixture was blended in a high shear mixer. The Desmodur™ was added immediately prior to coating to increase pot life of the coating. This coating was applied to the laminate by drawing down with a #12 wire wound rod and drying for about 30 seconds with a heat gun. The resulting coating was a brilliant white color with a semi gloss surface texture. When printed with standard black currency ink and tested as above, both the scored and unscored samples rated a 1.

A printed sample of this example was laundered as detailed above in the "Launderability" test method. The sample was washed and dried 5 times, then examined for the amount of ink that had survived the laundering. The same scale described in the printability/ink adhesion test method was used to evaluate ink adhesion in this test, but no tape was used. The sample rated a 1.

EXAMPLE 12

The coextruded foam of Example 4 was coated with an ink receptive coating without any corona treatment. The coating consisted of the following components and dry weight percentages: 32.0% Chlorinated Polyolefin 343-1 (Eastman Chemical Co., Kingsport, Tenn.), 59.8% Tipure R960™ (titanium dioxide) (E.I. Dupont de Nemours & Co., Wilmington, Del.), 5.2% Desmophen 1300-75 (polyester polyol) (Bayer Corp., Pittsburgh, Pa.), 2.8% Desmodur N75 BA™/X (1,6 hexamethylene diisocyanate polymer, Bayer Corp., Pittsburgh, Pa.), and 0.2% zinc octoate (ICN K&K Laboratories, Inc., Plainview, N.Y.). The zinc octoate was diluted to 10% solids in toluene, then the mixture was blended in a high shear mixer. The Desmodur™ was added immediately prior to coating to increase pot life of the coating. This coating was applied to the laminate by drawing down with a #12 wire wound rod and drying for about 30 seconds with heat. The resulting coating was a brilliant white color with a semi gloss surface texture. When printed with standard black currency ink and tested as above, the unscored sample rated a 1, while the scored sample rated a 2.

EXAMPLE 13

The coextruded foam of Example 4 was coated with an ink receptive coating after 1 $J/cm^2$ $N_2$ corona treatment. The coating consisted of the following components and dry weight percentages: 40.0% Chlorinated Polyolefin 343-1™, 59.8% Tipure R960™, and 0.2% zinc octoate. The zinc octoate was diluted to 10% solids in toluene, and then the mixture was blended in a high shear mixer. This coating was applied to the laminate by drawing down with a #12 wire wound rod and drying for about 30 seconds with a heat gun. The resulting coating was a brilliant white color with a semi gloss surface texture. When printed with standard black currency ink and tested as above, the unscored sample rated a 2, while the scored sample rated a 1.

A printed sample of this example was laundered as detailed above in the "Launderability" test method. The sample was washed and dried 5 times, then examined for the amount of ink that had survived the laundering. The same scale described in the printability/ink adhesion test method was used to evaluate ink adhesion in this test, but no tape was used. The sample rated a 1.

EXAMPLE 14

The coextruded foam of Example 4 was coated with an ink receptive coating without any corona treatment. The coating consisted of the following components and dry weight percentages: 40.0% Chlorinated Polyolefin 343-1™, 59.8% Tipure R960™, and 0.2% zinc octoate. The zinc octoate was diluted to 10% solids in toluene, and then the mixture was blended in a high shear mixer. This coating was applied to the laminate by drawing down with a #12 wire wound rod and drying for about 30 seconds with a heat gun. The resulting coating was a brilliant white color with a semi gloss surface texture. When printed with standard black currency ink and tested as above, the unscored sample rated a 1, while the scored sample rated a 3.

EXAMPLE 15

A melt mixture of 98% high melt strength polypropylene (Chisso FH3400™, Chisso Corp., Pittsford, N.Y.) and 2% by weight of FM 1307H™ chemical blowing agent (50% azodicarbonamide loaded in polyethylene) (Ampacet Co., Cincinnati, Ohio) was prepared in a 6.3 cm single screw extruder (SSE) (Davis-Standard Corp., Cedar Grove, N.J.) equipped with a Saxton single stage screw at 50 rpm and a temperature profile from 132 to 229 to 149° C. The exit melt temperature was 131° C., creating an exit pressure of 16.9 MPa. The melt mixture was extruded into the core of a three-layer feedblock set at 182° C. with Bynel 3101 fed into the outer layers of the feedblock. The Bynel 3101 was fed at 5.5 lbs/hr using a Killion 2.5 cm single screw extruder (Davis-Standard Corp., Cedar Grove, N.J.). The combined streams were then fed into the core of a 254 mm three-layer die set at 182° C. The outside layers of the die were not used. The resulting foam sheet with skins was cooled on a chrome cast roll at 10° C., then collected at a draw rate of 3.3 m/min. The foam composite had a density of 0.56 g/cc at a thickness of 1.24 mm. This foam was biaxially oriented using a Karo batch orienter at draw ratios of 4 in the machine direction (MD) and 4 in the cross direction (CD). The temperature during orientation was 140° C. The density of the oriented foam composite was 0.25 g/cc. The oriented foam was opaque and still had a paper-like feel since the skin thickness was less than the cell size of the foam. This foam was subjected to the Printiability/Ink Adhesion, Launderability, and Crumple Evaluation tests as described above and then rated for ink adhesion. The sample rated a 1 in the unscored, scored, and crumple tests, and rated a 2 in the launderability test.

EXAMPLE 16

The foam of Example 5 was treated with a nitrogen corona of 1 J/cm² on both sides. The surface-treated foam was then extrusion-coated with Bynel 3101 on one side to create a 2-layer foam/unfoamed skin composite. The Bynel 3101 was fed into a 254 mm, single-layer die using a 1.9 cm single-screw Killion extruder (Davis-Standard Corp., Cedar Grove, N.J.). The temperature profile of the extruder went from 380 to 440° C. and the die was set at 440° C. The Bynel 3101 was fed at 5.3 lb/hr and the coated foam was collected at a draw rate of 12.2 m/min. The coated side of the foam was tested according to the Printability/Ink Adhesion test described above and rated a 1 in both the unscored and scored tests.

TABLE 1

| Sample ID | Bending Stiffness (N) | Trouser tear (N) | Graves ETB (N-mm) | Thickness (μm) |
|---|---|---|---|---|
| Ex. 1 | 20 | 0.40 | 12 | 130 |
| New US $1 | 85 | 1.0 | 10 | 125 |
| Securency | 60 | 0.3 | 12 | 130 |
| Ex. 2 | 70 | 0.2 | 6 | 97 |
| Ex. 3 | 38 | 0.52 | 13 | 100 |
| Ex. 4 | 44 | 0.9 | 18 | 110 |
| Ex. 5 | 97 | 0.7 | 40 | 140 |

TABLE 2

Ink Adhesion Results

| Example | Sample | Crumple | Laundry | Adhesion Test | Scored Adhesion Test |
|---|---|---|---|---|---|
| 2 | Untreated | | | 5 | |
| 2 | Corona Treated | | | 1 | |
| 4 | Untreated | 4 | 5 | 5 | 5 |
| 5 | Untreated | 3 | 4 | 1 | 4 |
| 5 | Corona Treated | 2 | 2 | 1 | 3 |
| 7 | Treated, Coated | | 1 | 1 | 1 |
| 9 | Treated, Coated | | 2 | 2 | 4 |
| 11 | Treated, Coated | | 1 | 1 | 1 |
| 13 | Treated, Coated | | 1 | 2 | 1 |
| 15 | Coextruded | | 2 | 1 | 1 |
| 16 | Extrusion Coated | | | 1 | 1 |

Surface Smoothness

The surface smoothness of the foams of Examples 1, 2 and 4 where measured by using a contact stylus profilometer (Veeco Metrology Group, Chadds Ford, Pa., Model Dektak 8). The stylus used was a 12.5 micrometer radius diamond probe (45 degree angle). The force used was 6 milligrams, scan time (for 5 mm scan) was 20 seconds per scan. A total of 394 lines were scanned to create the 3D image of a 5 mm×5 mm sample area. For comparative purposes, a microfibrillated foam surface, prepared as described in U.S. Pat. No. 6,468,451 (Perez et al.), was also measured. The results are reported in Table 3. In Table 3, the following measured/calculated values, according to ANSI B46.1, are reported:

$R_A$—the average surface roughness calculated over the entire measured array, $R_q$—the root-mean-square roughness calculated over the entire measured array, $R_Z$—the average of the ten great peak-to-valley separations in the sample, $R_t$—the peak to valley difference over the entire measured array, $R_v$—the maximum profile valley depth; the height difference between the mean line and the lowest point over the entire evaluation length, $R_{vm}$—the maximum profile valley depth; the average of the successive $R_v$ values over the evaluation length, $R_{pm}$—the average maximum profile peak height; the average of the successive $R_p$ values over the evaluation length.

| Sample | $R_A$ (μm) | $R_q$ (μm) | $R_Z$ (μm) | $R_t$ (μm) | $R_v$ (μm) | $R_{vm}$ (μm) | $R_{pm}$ (μm) |
|---|---|---|---|---|---|---|---|
| Ex. 1 | 2.62 | 3.25 | 22.5 | 24.1 | −11.22 | −13.35 | 12.15 |
| Ex. 2 | 1.22 | 1.54 | 9.77 | 10.14 | −4.80 | −4.66 | 5.11 |
| Ex. 4 | 2.38 | 3.02 | 21.31 | 23.45 | −12.66 | −11.95 | 9.36 |
| Fibrillated foam | 22.75 | 28.63 | 243.87 | 272.73 | −152.24 | −140.68 | 103.19 |

What is claimed is:

1. A printable substrate comprising at least one high melt-strength, oriented polypropylene, closed cell foam layer having an ink-receptive surface, said foam layer having two substantially smooth major surfaces.

2. The substrate of claim 1 wherein said foam layer having a cellular morphology through the thickness of the layer.

3. The substrate of claim 1 wherein said foam layer, prior to orientation, has an average cell dimension of 100 micrometers or less.

4. The substrate of claim 1 wherein ink receptive surface comprises a corona-treated foam surface.

5. The substrate of claim 1 wherein ink receptive surface comprises an ink-receptive coating on a surface of said foam layer.

6. The substrate of claim 1 wherein ink receptive surface comprises an ink-receptive film layer.

7. The substrate of claim 6 wherein said ink-receptive film layer is selected from the group of ethylene/acrylic acid copolymers, ethylene/vinyl acetate copolymers, ethylene/vinyl acetate/carbon monoxide terpolymers, maleated polypropylene, and polyurethane.

8. The substrate of claim 1 wherein the high melt-strength polymer has a melt strength of 25 to 60 cN at 190° C.

9. The substrate of claim 1 wherein said polymer is a high melt-strength polypropylene comprising homo, and copolymers containing 50 weight percent or more propylene monomer units.

10. The substrate of claim 9 wherein said polypropylene copolymers are selected from random, block, and grafted copolymers of propylene and an α-olefin selected from the group consisting of $C_3$-$C_8$ α-olefins and $C_4$-$C_{10}$ dienes.

11. The substrate of claim 1 wherein said high melt strength polypropylene comprises a blend of a major amount of: said high melt strength polypropylene and a minor amount of another semicrystalline or amorphous polymer.

12. The substrate of claim 1 wherein said orientation is biaxial.

13. The substrate of claim 1 wherein both major surface of said foam layer have an ink-receptive surface.

14. A multilayer article comprising the substrate of claim 1 and further comprising at least one thermoplastic film layer.

15. The multilayer article of claim 14 comprising said thermoplastic film layer and said high melt strength foam layer having a bending stiffness of at least 40 Newtons.

16. The multilayer article of claim 14 having two high melt-strength, oriented polymer foam layers and a thermoplastic film layer disposed therebetween.

17. The multilayer article of claim 14 wherein said ink receptive film layer comprises a corona treated thermoplastic film layer.

18. The multilayer article of claim 14 wherein said ink receptive film layer comprises an ink-receptive coating on the surface of a thermoplastic polymer.

19. The multilayer article of claim 14 wherein said thermoplastic film layer is an inherently ink-receptive surface.

20. The multilayer article of claim 14 wherein said ink-receptive surface comprises corona treatment of said foam layer.

21. The multilayer article of claim 14 wherein said ink-receptive surface comprises an ink-receptive coating on said foam layer.

22. A security document comprising the substrate of claim 1.

23. A process for making an ink-receptive article of claim 1 comprising the steps of:
   (1) providing an oriented, high melt-strength polypropylene foam, said foam having two substantially smooth major surfaces; and
   (2) providing an ink-receptive surface on at least one major surface of the foam.

24. The process of claim 23 wherein said oriented, high melt-strength polypropylene foam is prepared by the steps of:
   (1) mixing at least one high melt strength polypropylene and at least one blowing agent in an apparatus having an exit shaping orifice at a temperature and pressure sufficient to form a melt mixture wherein the blowing agent is uniformly distributed throughout the polypropylene;
   (2) reducing the temperature of the melt mixture at the exit of the apparatus to an exit temperature that is no more than 30° C. above the melt temperature of the neat polypropylene while maintaining the melt mixture at a pressure sufficient to prevent foaming
   (3) passing the mixture through said exit shaping orifice and exposing the mixture to atmospheric pressure, whereby the blowing agent expands causing cell formation resulting in foam formation, and
   (4) orienting said foam.

* * * * *

UNITED STATES PATENT AND TRADEMARK OFFICE
CERTIFICATE OF CORRECTION

PATENT NO. : 7,655,296 B2
APPLICATION NO. : 11/460436
DATED : February 2, 2010
INVENTOR(S) : Christopher K. Haas It is certified that error appears in the above-identified patent and that said Letters Patent is hereby corrected as shown below:

Title page,
Column 2, line 2 item [57] under the heading "Abstract", after "comprise" delete "and" and insert -- an --.

Second page,
Column 2, line 2 under the heading "Other Publications", delete "Bioaxially" and insert -- Biaxially --.

Column 1,
Line 10, after "published" insert -- by --.

Column 2,
Line 40, after "foam" insert -- . --.

Column 4,
Line 19, delete "group." and insert -- group; --.

Column 5,
Line 52, delete "C3-C8" and insert -- $C_3$-$C_8$ --.
Line 52, delete "C4-C10" and insert -- $C_4$-$C_{10}$ --.
Line 55, delete "C3-C8" and insert -- $C_3$-$C_8$ --.
Line 56, delete "C3-C8" and insert -- $C_3$-$C_8$ --.
Line 59, delete "C4-C10" and insert -- $C_4$-$C_{10}$ --.

Column 7,
Line 51, below "Del." insert -- Other useful ink-receptive coatings include those described in U.S. Patent Nos. --.

Column 10,
Line 24, delete "thereof," and insert -- thereof; --.

Column 11,
Line 33, delete "a ink" and insert -- an ink --.

Column 20,
Lines 31 and 32, delete "stochiometric" and insert -- stoichiometric --.
Line 40, delete "stochiometric" and insert -- stoichiometric --.
Line 43, delete "stochiometric" and insert -- stoichiometric --.
Line 62, delete "a ink" and insert -- an ink --.

Column 32,
Line 61, delete "homo," and insert -- homo- --.

Column 33,
Line 2, delete "of:" and insert -- of --.

Column 34,
Line 23, after "foaming" insert -- ; --.

Signed and Sealed this

Thirteenth Day of April, 2010

David J. Kappos
*Director of the United States Patent and Trademark Office*